United States Patent
Shin et al.

(10) Patent No.: US 11,874,698 B2
(45) Date of Patent: Jan. 16, 2024

(54) DISPLAY DEVICE AND ELECTRONIC DEVICE INCLUDING THE SAME

(71) Applicant: Samsung Display Co., Ltd., Yongin-si (KR)

(72) Inventors: Jaiku Shin, Hwaseong-si (KR); Dongwoo Seo, Suwon-si (KR); Jihye Shin, Cheonan-si (KR); Jin Yong Sim, Seongnam-si (KR); Seokchan Lee, Suwon-si (KR); Sung Chul Choi, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/705,860

(22) Filed: Mar. 28, 2022

(65) Prior Publication Data

US 2022/0404867 A1 Dec. 22, 2022

(30) Foreign Application Priority Data

Jun. 14, 2021 (KR) ........................ 10-2021-0076686

(51) Int. Cl.
*G06F 1/16* (2006.01)

(52) U.S. Cl.
CPC .......... *G06F 1/1616* (2013.01); *G06F 1/1643* (2013.01); *G06F 1/1652* (2013.01); *G06F 1/1656* (2013.01)

(58) Field of Classification Search
CPC .................................................... G06F 1/1616
See application file for complete search history.

(56) References Cited

U.S. PATENT DOCUMENTS

| | | | | |
|---|---|---|---|---|
| 10,074,824 B2 * | 9/2018 | Han | ..................... | H05K 5/0017 |
| 10,541,373 B2 * | 1/2020 | Park | ..................... | H04M 1/0216 |
| 10,916,719 B2 * | 2/2021 | Park | ..................... | H10K 50/84 |
| 10,930,883 B2 | 2/2021 | Park | | |
| 11,508,922 B2 * | 11/2022 | Park | ..................... | H10K 59/131 |
| 11,594,155 B2 * | 2/2023 | Yoon | ..................... | H04M 1/0268 |
| 11,594,710 B2 * | 2/2023 | Horiuchi | ............... | H10K 50/84 |
| 11,605,796 B2 * | 3/2023 | Kim | ..................... | G06F 1/1616 |

(Continued)

FOREIGN PATENT DOCUMENTS

| | | |
|---|---|---|
| EP | 3865971 A1 | 8/2021 |
| KR | 1020130102812 A | 9/2013 |

(Continued)

*Primary Examiner* — Lisa Lea-Edmonds
(74) *Attorney, Agent, or Firm* — CANTOR COLBURN LLP

(57) ABSTRACT

A display device includes a display panel including a first non-folding area, a folding area, and a second non-folding area and a support plate that is disposed under the display panel and that defines a plurality of openings overlapping the folding area and arranged in a first direction and a second direction intersecting the first direction. The support plate includes a first branch disposed between openings adjacent to each other in the second direction among the plurality of openings and a second branch disposed between openings adjacent to each other in the first direction among the plurality of openings. A first width of the first branch in the second direction is smaller than a second width of each of the openings in the second direction.

20 Claims, 17 Drawing Sheets

(56) References Cited

U.S. PATENT DOCUMENTS

| | | | |
|---|---|---|---|
| 11,627,671 B2* | 4/2023 | Feng | G06F 1/1652 |
| | | | 361/807 |
| 2019/0131553 A1* | 5/2019 | Park | H10K 50/84 |
| 2020/0119293 A1* | 4/2020 | Park | G06F 1/1652 |
| 2021/0066626 A1 | 3/2021 | Park et al. | |
| 2021/0119171 A1* | 4/2021 | Kim | E05D 3/18 |
| 2021/0259119 A1* | 8/2021 | Seo | H04M 1/0268 |
| 2022/0048272 A1* | 2/2022 | Kang | B32B 15/20 |
| 2022/0061168 A1* | 2/2022 | Shin | B32B 7/14 |
| 2022/0374058 A1* | 11/2022 | Kim | G06F 1/1686 |
| 2022/0404867 A1* | 12/2022 | Shin | G06F 1/1681 |
| 2023/0081522 A1* | 3/2023 | Park | G06F 1/1652 |
| 2023/0099961 A1* | 3/2023 | Lee | H04M 1/0268 |
| | | | 361/807 |
| 2023/0114378 A1* | 4/2023 | Han | G09F 9/301 |
| | | | 361/679.27 |

FOREIGN PATENT DOCUMENTS

| | | |
|---|---|---|
| KR | 1020180036904 A | 4/2018 |
| KR | 1020190003257 A | 1/2019 |
| KR | 1020190124844 A | 11/2019 |
| KR | 1020210025747 A | 3/2021 |
| KR | 1020210068354 A | 6/2021 |

* cited by examiner

DISPLAY DEVICE AND ELECTRONIC DEVICE INCLUDING THE SAME

This application claims priority to Korean Patent Application No. 10-2021-0076686, filed on Jun. 14, 2021, and all the benefits accruing therefrom under 35 U.S.C. § 119, the content of which in its entirety is herein incorporated by reference.

BACKGROUND

1. Field

Embodiments of the invention described herein relate to a display device and an electronic device including the same.

2. Description of the Related Art

In general, a display device includes a display module for displaying an image and a support part for supporting the display module. The display module includes a display panel that displays an image, a window that is disposed over the display panel and that protects the display panel from external scratches and shocks, and a protective layer that is disposed under the display panel and that protects the display panel from external shocks. The support part has a higher rigidity than a rigidity of the display module and supports the display module.

Nowadays, with a development of display device technologies, flexible display devices deformable in various forms are being developed. The flexible display devices include a flexible display module that may be folded or rolled. A support part disposed under the flexible display module foldable about a folding axis has a structure foldable together with the flexible display module.

SUMMARY

Embodiments of the invention provide a display device including a support plate more easily foldable together with a display module, and an electronic device including the display device.

In an embodiment, a display device includes a display panel including a first non-folding area, a folding area, and a second non-folding area and a support plate that is disposed under the display panel. A plurality of openings is defined in the support plate, and arranged in a first direction and a second direction intersecting the first direction and overlap the folding area. The support plate includes a first branch disposed between openings adjacent to each other in the second direction among the plurality of openings and a second branch disposed between openings adjacent to each other in the first direction among the plurality of openings. A first width of the first branch in the second direction is smaller than a second width of each of the openings in the second direction.

In an embodiment, a display device includes a display panel including a first non-folding area, a folding area, and a second non-folding area and a support plate that is disposed under the display panel. A plurality of openings is defined in the support plate, and arranged in a first direction and a second direction intersecting the first direction and overlap the folding area. The support plate includes a first branch that is disposed between openings adjacent to each other in the second direction among the plurality of openings and that has a first width in the second direction and a second branch disposed between openings adjacent to each other in the first direction among the plurality of openings. A value obtained by dividing a second width of each of the openings in the second direction by the first width is greater than about 1.1 and less than about 2.0, a value obtained by dividing a length of each of the openings in the first direction by the first width is equal to or greater than about 35, and the first width is greater than about 0.13 millimeter.

In an embodiment, an electronic device includes a display device in which a first hole area through which an optical signal passes is defined, an electro-optical module that is disposed under the display device and that overlaps the first hole area and receives the optical signal, and a case that accommodates the display device and the electro-optical module. The display device includes a display panel including a first non-folding area, a folding area, and a second non-folding area and a support plate that is disposed under the display panel. A plurality of openings is defined in the support plate, and arranged in a first direction and a second direction intersecting the first direction and overlap the folding area. The support plate includes a first branch that is disposed between openings adjacent to each other in the second direction among the plurality of openings and that has a first width in the second direction and a second branch disposed between openings adjacent to each other in the first direction among the plurality of openings. A value obtained by dividing a second width of each of the openings in the second direction by the first width is greater than about 1.1 and less than about 2.0, and a value obtained by dividing a length of each of the openings in the first direction by the first width is equal to or greater than about 35.

BRIEF DESCRIPTION OF THE DRAWINGS

The above and other objects and features of the invention will become apparent by describing in detail embodiments thereof with reference to the accompanying drawings.

DETAILED DESCRIPTION

Figure 1:
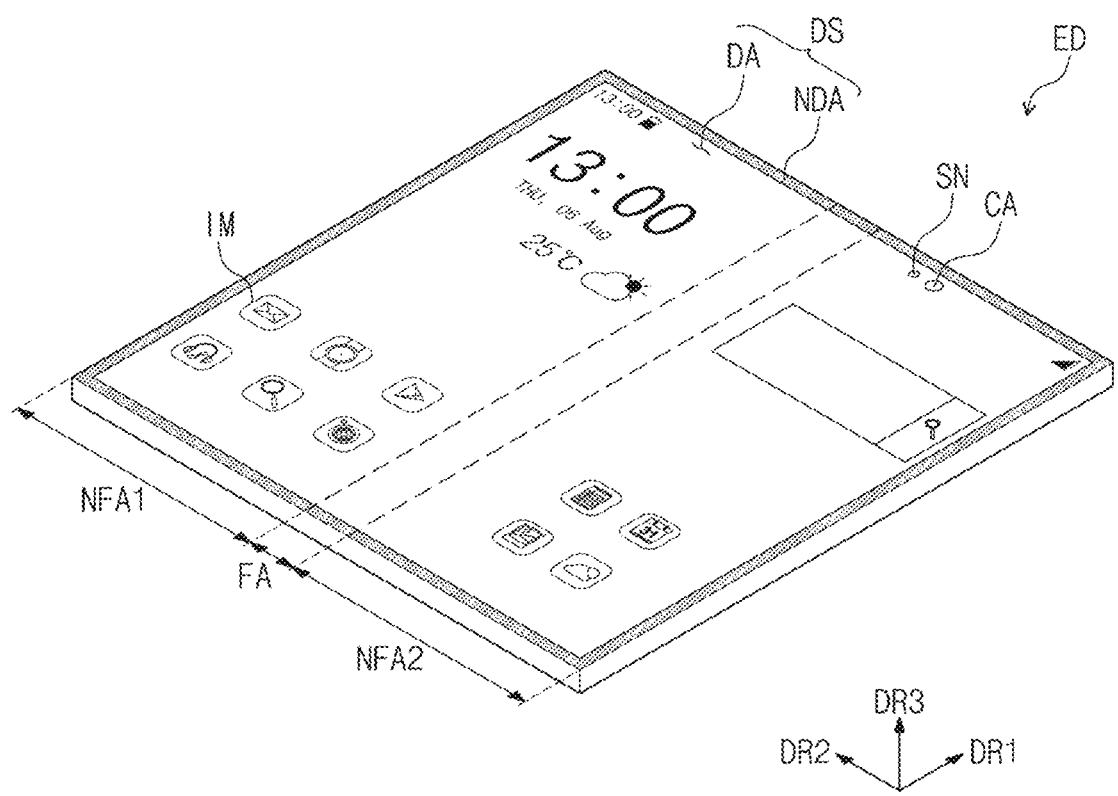
FIG. 1 is a perspective view of an embodiment of an electronic device according to the invention.

In this specification, when it is mentioned that a component (or, an area, a layer, a part, etc.) is referred to as being "on", "connected to" or "coupled to" another component, this means that the component may be directly on, connected to, or coupled to the other component or a third component may be present therebetween.

Identical reference numerals refer to identical components. Additionally, in the drawings, the thicknesses, proportions, and dimensions of components are exaggerated for effective description.

As used herein, the term "and/or" includes all of one or more combinations defined by related components.

Terms such as first, second, and the like may be used to describe various components, but the components should not be limited by the terms. The terms may be used only for distinguishing one component from other components. For example, without departing the scope of the invention, a first component may be referred to as a second component, and similarly, the second component may also be referred to as the first component. The terms of a singular form may include plural forms unless otherwise specified.

In addition, terms such as "below", "under", "above", and "over" are used to describe a relationship of components illustrated in the drawings. The terms are relative concepts and are described based on directions illustrated in the drawing.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms used herein, including technical or scientific terms, have the same meanings as those generally understood by those skilled in the art to which the disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the application.

It should be understood that terms such as "comprise", "include", and "have", when used herein, specify the presence of stated features, numbers, steps, operations, components, parts, or combinations thereof, but do not preclude the presence or addition of one or more other features, numbers, steps, operations, components, parts, or combinations thereof.

Hereinafter, embodiments of the invention will be described with reference to the accompanying drawings.

Figure 2:
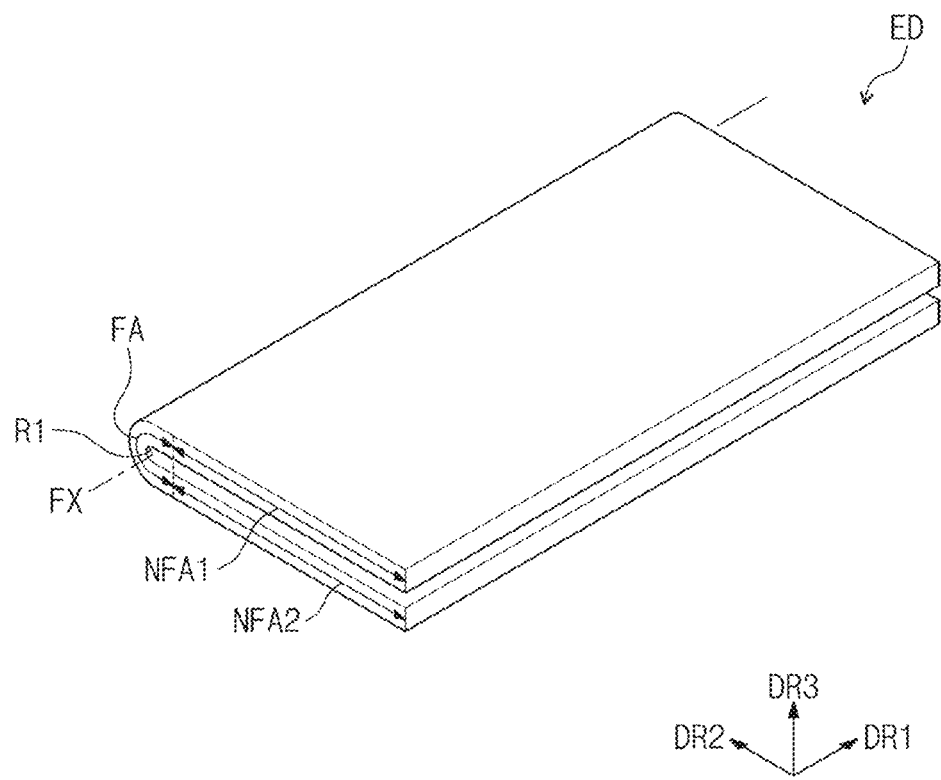
FIGS. 2 and 3 are views illustrating a folded state of the electronic device illustrated in FIG. 1.
Figure 3:
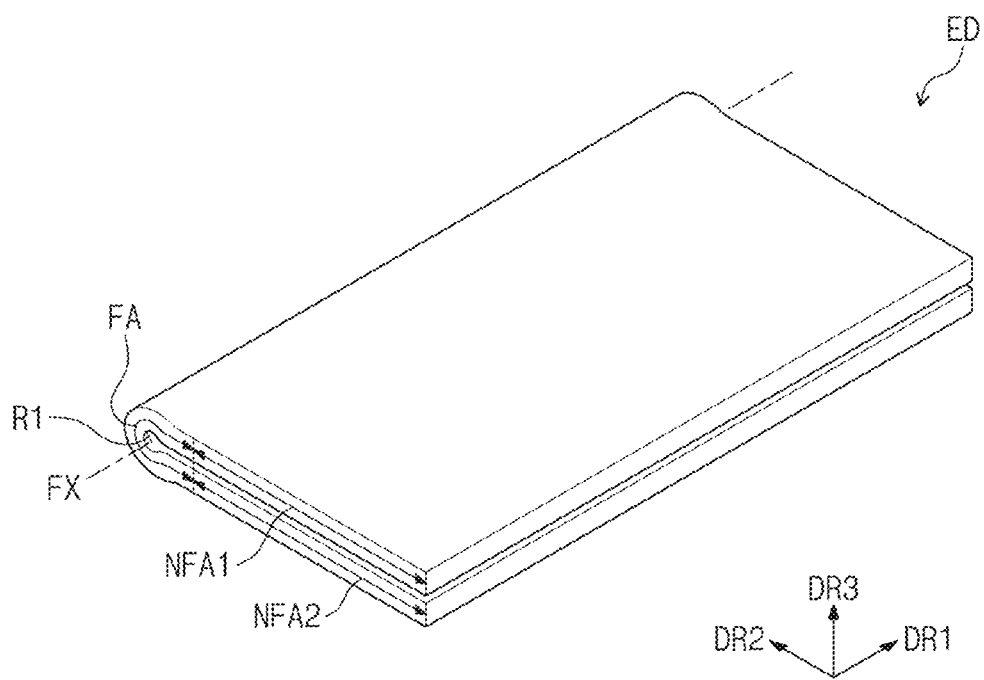

FIG. 1 is a perspective view of an embodiment of an electronic device according to the invention. FIGS. 2 and 3 are views illustrating a folded state of the electronic device illustrated in FIG. 1.

Referring to FIG. 1, the electronic device ED in the embodiment of the invention may have a quadrangular (e.g., rectangular) shape with long sides extending in a first direction DR1 and short sides extending in a second direction DR2 intersecting the first direction DR1. However, without being limited thereto, the electronic device ED may have various shapes such as a circular shape, a polygonal shape, or the like. The electronic device ED may be a flexible display device.

Hereinafter, a direction substantially perpendicular to a plane defined by the first direction DR1 and the second direction DR2 is defined as a third direction DR3. Furthermore, the expression "in the plan view" used herein may be defined as a state viewed in the third direction DR3.

The electronic device ED may include a folding area FA and a plurality of non-folding areas NFA1 and NFA2. The non-folding areas NFA1 and NFA2 may include the first non-folding area NFA1 and the second non-folding area NFA2. The folding area FA may be disposed between the first non-folding area NFA1 and the second non-folding area NFA2. The folding area FA, the first non-folding area NFA1, and the second non-folding area NFA2 may be arranged in the second direction DR2.

Although one folding area FA and two non-folding areas NFA1 and NFA2 are illustrated, the number of folding areas FA and the number of non-folding areas NFA1 and NFA2 are not limited thereto. In an embodiment, the electronic device ED may include more than two non-folding areas and a plurality of folding areas disposed between the non-folding areas, for example.

An upper surface of the electronic device ED may be defined as a display surface DS, and the display surface DS may have a plane defined by the first direction DR1 and the second direction DR2. Images IM generated by the electronic device ED may be provided to a user through the display surface DS.

The display surface DS may include a display area DA and a non-display area NDA around the display area DA. The display area DA may display an image, and the non-display area NDA may not display an image. The non-display area NDA may surround the display area DA and may define a border of the electronic device ED that is printed in a predetermined color.

The electronic device ED may include at least one sensor SN and at least one camera CA. The sensor SN and the camera CA may be adjacent to the border of the electronic device ED. The sensor SN and the camera CA may be disposed in the display area DA adjacent to the non-display area NDA. The sensor SN and the camera CA may be disposed in the second non-folding area NFA2. However, without being limited thereto, the sensor SN and the camera CA may be disposed in the first non-folding area NFA1.

Light may transmit through the portions of the electronic device ED in which the sensor SN and the camera CA are disposed and may be incident on the camera CA and the sensor SN. In an embodiment, the sensor SN may be a proximity illuminance sensor, for example, but is not limited thereto. The camera CA may take an external image. In an embodiment, a plurality of sensors SN and a plurality of cameras CA may be provided.

Referring to FIGS. 2 and 3, the electronic device ED may be a foldable electronic device ED that is folded or unfolded. In an embodiment, the folding area FA may be bent about a folding axis FX parallel to the first direction DR1, and the electronic device ED may be folded accordingly, for example. The folding axis FX may be defined as a long axis parallel to the long sides of the electronic device ED.

When the electronic device ED is folded, the first non-folding area NFA1 and the second non-folding area NFA2 may face each other, and the electronic device ED may be folded in an in-folding manner such that the display surface DS is not exposed to the outside. However, the invention is not limited thereto. In an embodiment, the electronic device ED may be folded about the folding axis FX in an out-folding manner such that the display surface DS is exposed to the outside, for example.

As illustrated in FIG. 2, the distance between the first non-folding area NFA1 and the second non-folding area NFA2 may be substantially the same as two times the radius of curvature R1 in the third direction DR3. However, without being limited thereto, as illustrated in FIG. 3, the distance between the first non-folding area NFA1 and the second non-folding area NFA2 may be smaller than two times the radius of curvature R1 in the third direction DR3.

Figure 4:
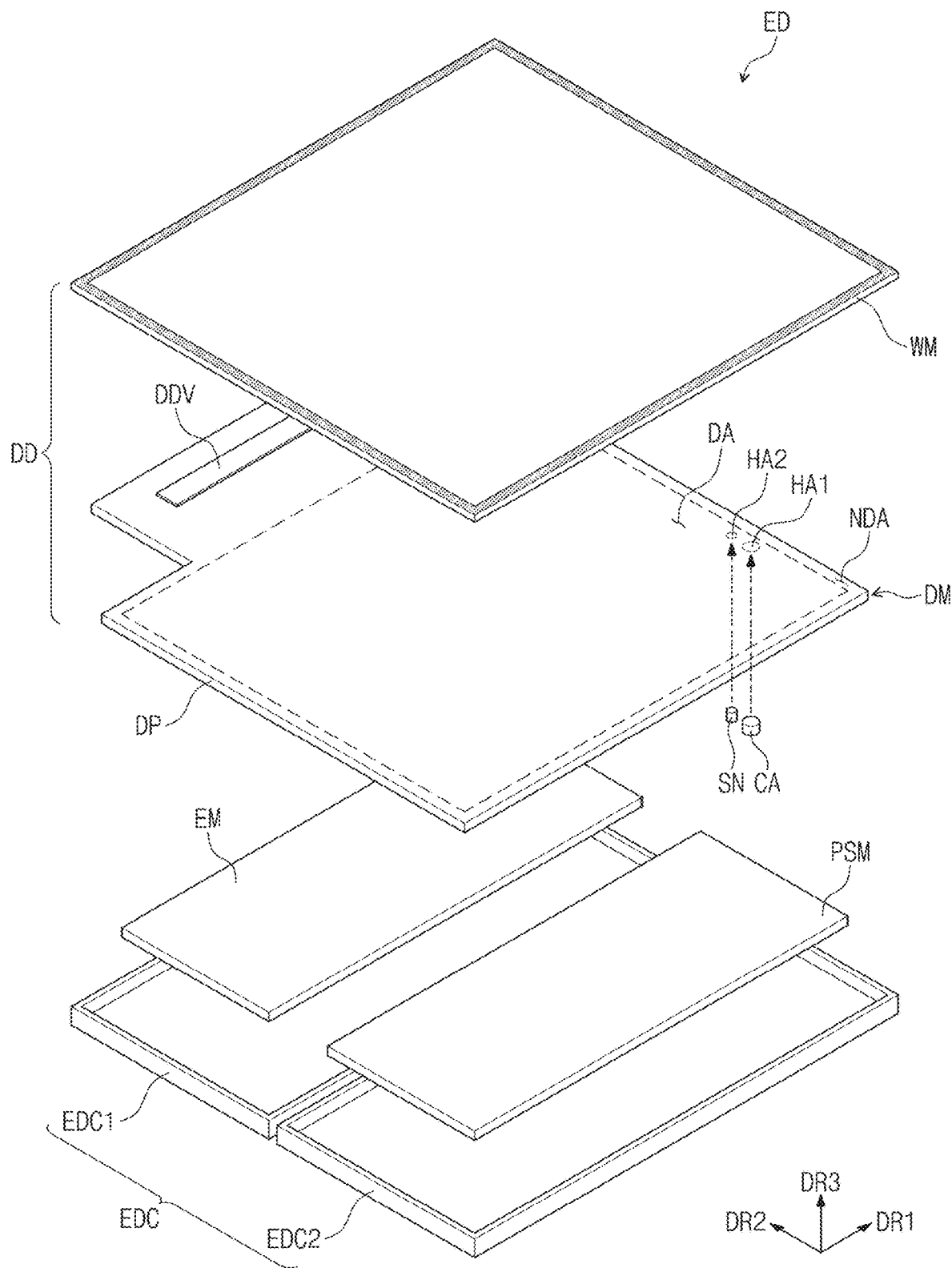
FIG. 4 is an exploded perspective view of the electronic device illustrated in FIG. 1.

FIG. 4 is an exploded perspective view of the electronic device illustrated in FIG. 1.

Referring to FIG. 4, the electronic device ED may include a display device DD, the camera CA, the sensor SN, an electronic module EM, a power supply module PSM, and a case EDC. Although not separately illustrated, the electronic device ED may further include a mechanical structure (e.g., a hinge) for controlling a folding motion of the display device DD.

The display device DD may generate an image and may sense an external input. The display device DD may include a window module WM and a display module DM. The window module WM may provide a front side of the electronic device ED. The window module WM may be disposed over the display module DM and may protect the display module DM. The window module WM may pass light generated from the display module DM and may provide the light to the user.

The display module DM may include at least a display panel DP. Although only the display panel DP among laminated structures of the display module DM is illustrated in FIG. 4, the display module DM may substantially further include a plurality of components disposed over and under the display panel DP. A detailed stack structure of the display module DM will be described below in detail.

The display panel DP may include a display area DA and a non-display area NDA that correspond to the display area DA (refer to FIG. 1) and the non-display area NDA (refer to FIG. 1) of the electronic device ED. The expression "an area/portion corresponds to another area/portion" used herein may mean that the areas/portions overlap each other and is not limited to having the same area.

A first hole area HA' and a second hole area HA2 may be defined in the display panel DP. The first hole area HA' and the second hole area HA2 may have a higher light transmittance than that of the surrounding area. The camera CA may be disposed under the first hole area HAL and the sensor SN may be disposed under the second hole area HA2. Light passing through the first hole area HA' and the second hole area HA2 may be incident on the camera CA and the sensor SN.

The display module DM may include a data driver DDV disposed in the non-display area NDA of the display panel DP. The data driver DDV may be manufactured in the form of an integrated circuit ("IC") chip and may be disposed (e.g., mounted) in the non-display area NDA. However, without being limited thereto, the data driver DDV may be disposed (e.g., mounted) on a flexible circuit board connected to the display panel DP.

The electronic module EM and the power supply module PSM may be disposed under the display device DD. Although not illustrated, the electronic module EM and the power supply module PSM may be connected with each other through a separate flexible circuit board. The electronic module EM may control operation of the display device DD. The power supply module PSM may supply power to the electronic module EM.

The case EDC may accommodate the display device DD, the electronic module EM, and the power supply module PSM. To fold the display device DD, the case EDC may include a first case EDC1 and a second case EDC2. The first case EDC1 and the second case EDC2 may extend in the first direction DR1 and may be arranged in the second direction DR2.

Although not illustrated, the electronic device ED may further include a hinge structure for connecting the first case EDC1 and the second case EDC2. The case EDC may be coupled with the window module WM. The case EDC may protect the display device DD, the electronic module EM, and the power supply module PSM.

Figure 5:
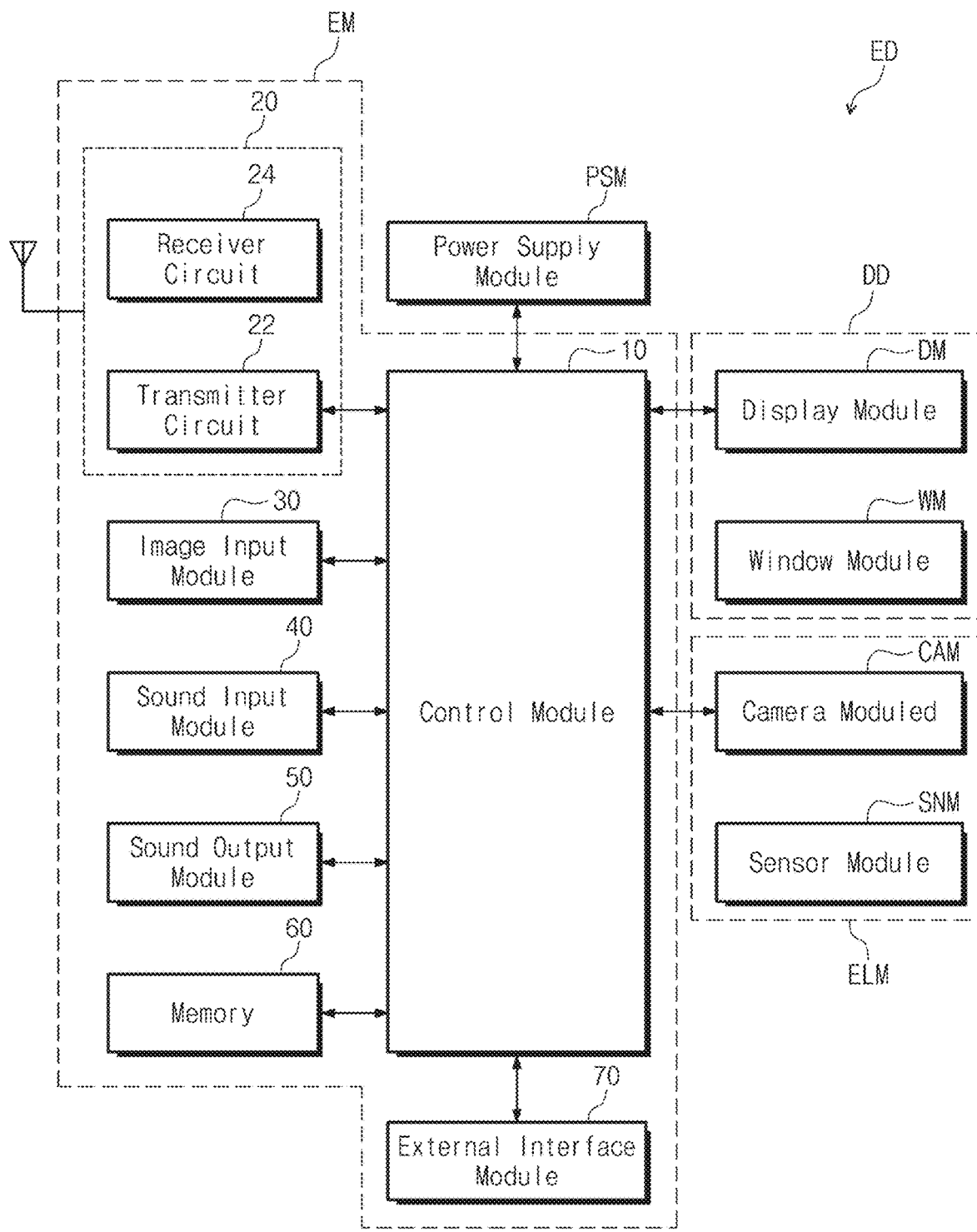
FIG. 5 is a block diagram of the electronic device illustrated in FIG. 4.

FIG. 5 is a block diagram of the electronic device illustrated in FIG. 4.

Referring to FIG. 5, the electronic device ED may include the electronic module EM, the power supply module PSM, the display device DD, and an electro-optical module ELM. The electronic module EM may include a control module 10, a wireless communication module 20, an image input module 30, a sound input module 40, a sound output module 50, a memory 60, an external interface module 70, or the like. The modules may be disposed (e.g., mounted) on a circuit board, or may be electrically connected through a flexible circuit board. The electronic module EM may be electrically connected with the power supply module PSM.

The control module 10 may control overall operation of the electronic device ED. In an embodiment, the control module 10 may activate or deactivate the display device DD in response to a user input, for example. The control module 10 may control the image input module 30, the sound input module 40, and the sound output module 50 in response to a user input. The control module 10 may include at least one microprocessor.

In an embodiment, the wireless communication module 20 may transmit/receive a wireless signal with another terminal through wireless communication such as Bluetooth or Wi-Fi. The wireless communication module 20 may transmit/receive a voice signal using a general communication line. The wireless communication module 20 may include a transmitter circuit 22 that modulates a signal to be transmitted and transmits the modulated signal and a receiver circuit 24 that demodulates a received signal.

The image input module 30 may process an image signal to covert the image signal into image data that may be displayed in the display device DD. The sound input module 40 may receive an external sound signal through a microphone in a voice recording mode or a voice recognition mode and may convert the external sound signal into electrical voice data. The sound output module 50 may convert sound data received from the wireless communication module 20 or sound data stored in the memory 60 and may output the converted data to the outside.

In an embodiment, the external interface module 70 may serve as an interface connected to an external charger, a wired/wireless data port, a card socket (e.g., a memory card or a subscriber identity module ("SIM")/user identity module ("UIM") card), or the like.

The power supply module PSM may supply power desired for overall operation of the electronic device ED. The power supply module PSM may include a conventional battery device.

The electro-optical module ELM may be an electronic part that outputs or receives an optical signal. The electro-optical module ELM may transmit or receive an optical signal through a partial area of the display device DD. In this embodiment, the electro-optical module ELM may include a camera module CAM and a sensor module SNM. The camera module CAM may include the camera CA illustrated in FIG. 4. The sensor module SNM may include the sensor SN illustrated in FIG. 4.

Figure 6:
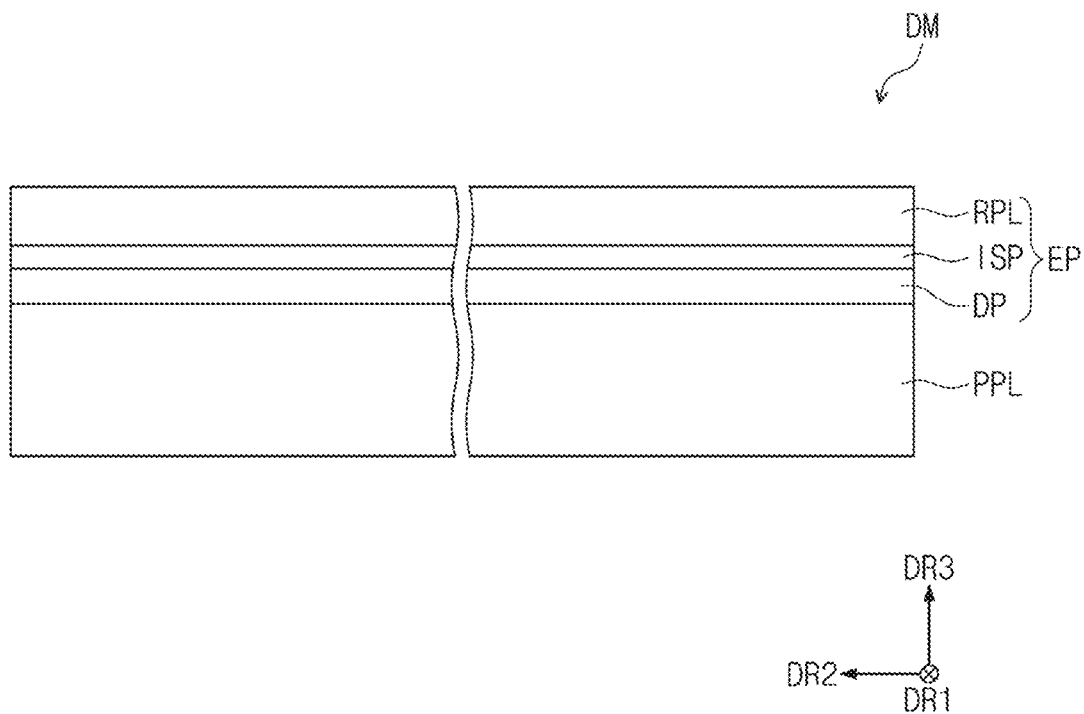
FIG. 6 is a schematic cross-sectional view of a display module illustrated in FIG. 4.

FIG. 6 is a schematic cross-sectional view of the display module illustrated in FIG. 4.

Referring to FIG. 6, the display module DM may include the display panel DP, an input sensing part ISP disposed over the display panel DP, an anti-reflection layer RPL disposed over the input sensing part ISP, and a panel protection layer PPL disposed under the display panel DP. The display panel DP may be a flexible display panel. In an embodiment, the display panel DP may include a flexible substrate and a plurality of elements disposed on the flexible substrate, for example.

The display panel DP in an embodiment of the invention may be an emissive display panel, but is not particularly limited thereto. In an embodiment, the display panel DP may be an organic light-emitting display panel or an inorganic light-emitting display panel, for example. An emissive layer of the organic light-emitting display panel may include an organic light-emitting material. In an embodiment, an emissive layer of the inorganic light-emitting display panel may include quantum dots, quantum rods, or the like. Hereinafter, it will be exemplified that the display panel DP is an organic light-emitting display panel.

The input sensing part ISP may include a plurality of sensors (not illustrated) for sensing an external input using a capacitive sensing technique. The input sensing part ISP may be directly formed or disposed on the display panel DP when the display module DM is manufactured.

The anti-reflection layer RPL may be disposed over the input sensing part ISP. The anti-reflection layer RPL may be directly formed or disposed on the input sensing part ISP when the display module DM is manufactured. The anti-reflection layer RPL may be defined as a film for preventing reflection of external light. The anti-reflection layer RPL may decrease the reflectivity of external light incident toward the display panel DP from above the display device DD.

In an embodiment, the input sensing part ISP may be directly formed or disposed on the display panel DP, and the anti-reflection layer RPL may be directly formed or disposed on the input sensing part ISP, for example. However, the invention is not limited thereto. In an embodiment, the input sensing part ISP may be separately manufactured and may be attached to the display panel DP by an adhesive layer, and the anti-reflection layer RPL may be separately manufactured and may be attached to the input sensing part ISP by an adhesive layer, for example.

The display panel DP, the input sensing part ISP, and the anti-reflection layer RPL may be defined as an electronic panel EP.

The panel protection layer PPL may be disposed under the display panel DP. The panel protection layer PPL may protect a lower portion of the display panel DP. The panel protection layer PPL may include a flexible plastic material. In an embodiment, the panel protection layer PPL may include PET, for example.

Figure 7:
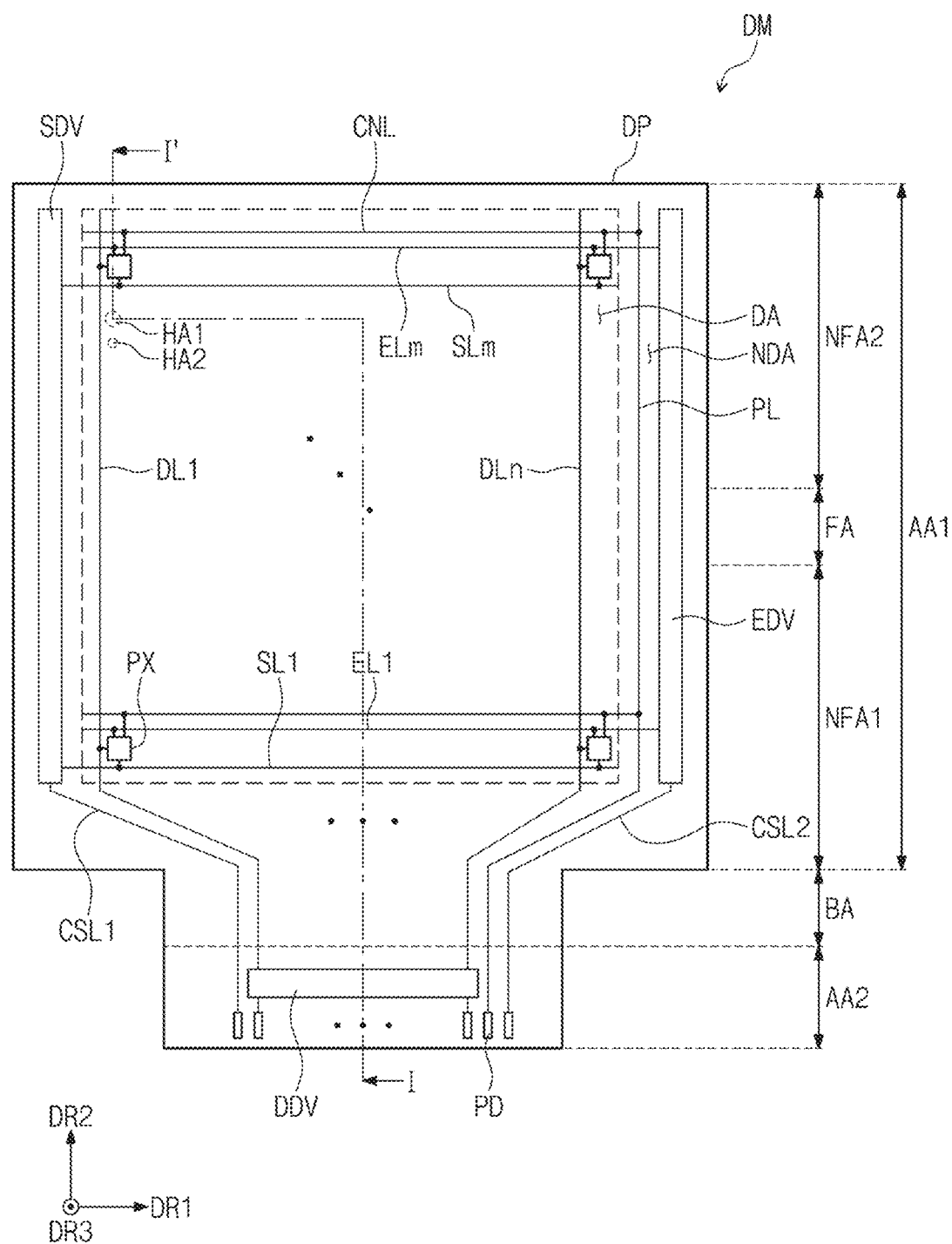
FIG. 7 is a plan view of a display panel illustrated in FIG. 4.

FIG. 7 is a plan view of the display panel illustrated in FIG. 4.

Referring to FIG. 7, the display module DM may include the display panel DP, a scan driver SDV, the data driver DDV, and an emission driver EDV.

The display panel DP may include a first area AA1, a second area AA2, and a bending area BA between the first area AA1 and the second area AA2. The bending area BA may extend in the first direction DR1, and the first area AA1, the bending area BA, and the second area AA2 may be arranged in the second direction DR2.

The first area AA1 may include a display area DA and a non-display area NDA around the display area DA. The non-display area NDA may surround the display area DA. The display area DA may be an area that displays an image, and the non-display area NDA may be an area that does not display an image. The second area AA2 and the bending area BA may be areas that do not display an image.

The first area AA1, when viewed in the first direction DR1, may include a first non-folding area NFA1, a second non-folding area NFA2, and a folding area FA between the first non-folding area NFA1 and the second non-folding area NFA2. The above-described first and second hole areas HA1 and HA2 may be defined in the display area DA and the second non-folding area NFA2.

The display panel DP may include a plurality of pixels PX, a plurality of scan lines SL1 to SLm, a plurality of data lines DL1 to DLn, a plurality of emission lines EL1 to ELm, first and second control lines CSL1 and CSL2, a power line PL, connecting lines CNL, and a plurality of pads PD. Here, m and n are natural numbers. The pixels PX may be disposed in the display area DA and may be connected to corresponding scan lines of the scan lines SL1 to SLm, corresponding data lines of the data lines DL1 to DLn, and corresponding emission lines of the emission lines EL1 to ELm.

The scan driver SDV and the emission driver EDV may be disposed in the non-display area NDA. The scan driver SDV and the emission driver EDV may be disposed in the non-display area NDA adjacent to opposite sides (e.g., left and right sides in FIG. 7) of the first area AA1 opposite to each other in the first direction DR1. The data driver DDV may be disposed in the second area AA2. The data driver DDV may be manufactured in the form of an IC chip and may be disposed (e.g., mounted) in the second area AA2.

The scan lines SL1 to SLm may extend in the first direction DR1 and may be connected to the scan driver SDV. The data lines DL1 to DLn may extend in the second direction DR2 and may be connected to the data driver DDV via the bending area BA. The emission lines EL1 to ELm may extend in the first direction DR1 and may be connected to the emission driver EDV.

The power line PL may extend in the second direction DR2 and may be disposed in the non-display area NDA. The power line PL may be disposed between the display area DA and the emission driver EDV. However, without being limited thereto, the power line PL may be disposed between the display area DA and the scan driver SDV.

The power line PL may extend to the second area AA2 via the bending area BA. The power line PL may extend toward a lower end of the second area AA2 in the plan view. The power line PL may receive a driving voltage.

The connecting lines CNL may extend in the second direction DR2 and may be arranged in the first direction DR1. The connecting lines CNL may be connected to the power line PL and the pixels PX. The driving voltage may be applied to the pixels PX through the power line PL and the connecting lines CNL connected together.

The first control line CSL1 may be connected to the scan driver SDV and may extend toward the lower end of the second area AA2 via the bending area BA. The second control line CSL2 may be connected to the emission driver EDV and may extend toward the lower end of the second area AA2 via the bending area BA. The data driver DDV may be disposed between the first control line CSL1 and the second control line CSL2.

The pads PD may be disposed adjacent to the lower end of the second area AA2 in the plan view. The data driver DDV, the power line PL, the first control line CSL1, and the second control line CSL2 may be connected to the pads PD.

The data lines DL1 to DLn may be connected to the corresponding pads PD through the data driver DDV. In an embodiment, the data lines DL1 to DLn may be connected to the data driver DDV, and the data driver DDV may be connected to the pads PD corresponding to the data lines DL1 to DLn, for example.

A printed circuit board PCB (refer to FIGS. 9 and 10) may be connected to the pads PD, and a timing controller and a voltage generator may be disposed on the printed circuit board PCB. The timing controller may be manufactured in the form of an IC chip and may be disposed (e.g., mounted) on the printed circuit board PCB. The timing controller and the voltage generator may be connected to the pads PD through the printed circuit board PCB.

The timing controller may control operations of the scan driver SDV, the data driver DDV, and the emission driver EDV. The timing controller may generate a scan control signal, a data control signal, and an emission control signal in response to control signals received from the outside. The voltage generator may generate the driving voltage.

The scan control signal may be provided to the scan driver SDV through the first control line CSL1. The emission control signal may be provided to the emission driver EDV through the second control line CSL2. The data control signal may be provided to the data driver DDV. The timing controller may receive image signals from the outside, may convert the data format of the image signals depending on the specification of an interface with the data driver DDV, and may provide the converted signals to the data driver DDV.

The scan driver SDV may generate a plurality of scan signals in response to the scan control signal. The scan signals may be applied to the pixels PX through the scan lines SL1 to SLm. The scan signals may be sequentially applied to the pixels PX.

The data driver DDV may generate a plurality of data voltages corresponding to the image signals in response to the data control signal. The data voltages may be applied to the pixels PX through the data lines DL1 to DLn. The emission driver EDV may generate a plurality of emission signals in response to the emission control signal. The emission signals may be applied to the pixels PX through the emission lines EL1 to ELm.

The pixels PX may receive the data voltages in response to the scan signals. The pixels PX may display an image by emitting light having luminance corresponding to the data voltages in response to the emission signals. Emission time of the pixels PX may be controlled by the emission signals.

Figure 8:
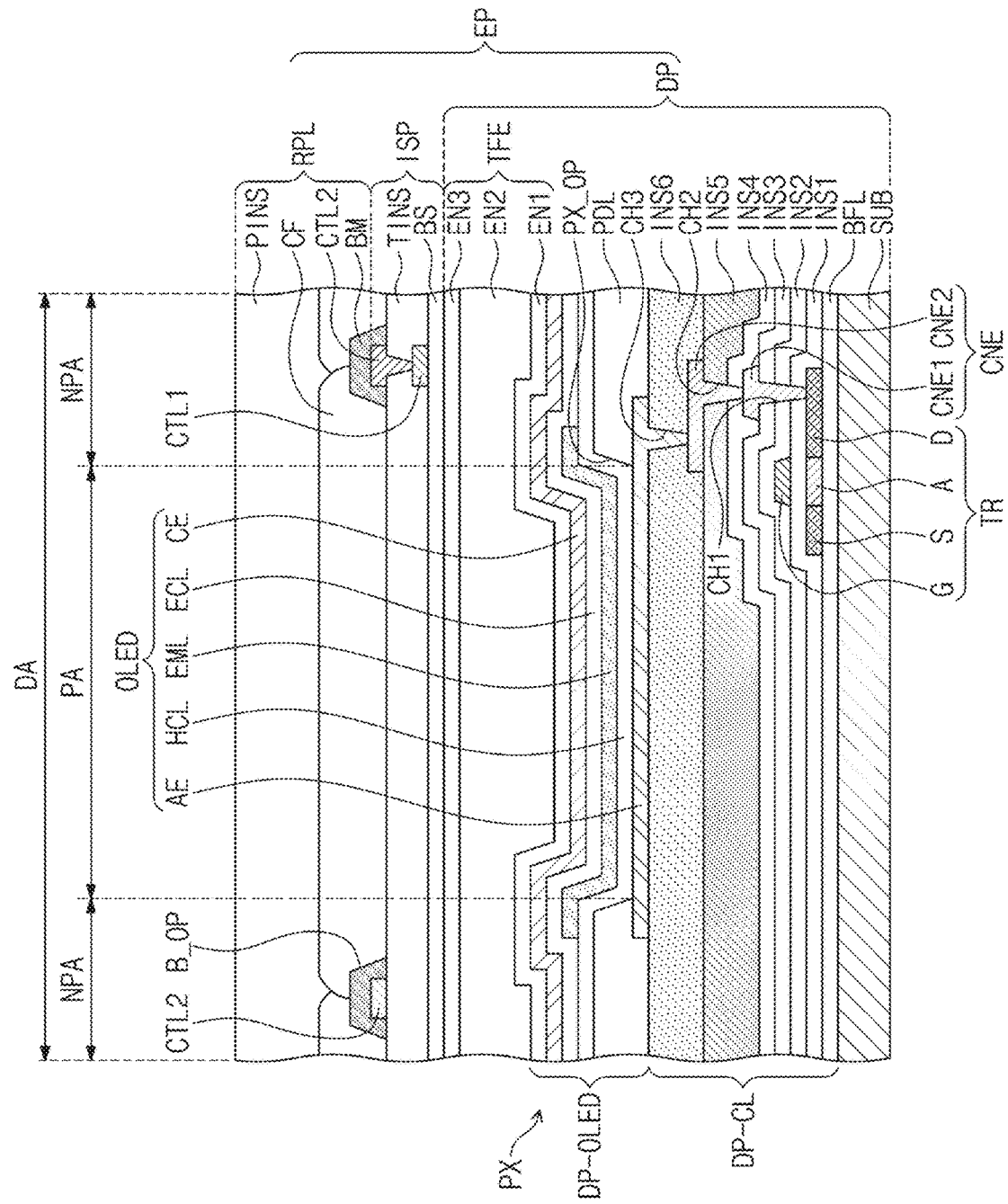
FIG. 8 is a view illustrating a section of an electronic panel corresponding to any one pixel illustrated in FIG. 7.

FIG. 8 is a view illustrating a section of the electronic panel corresponding to any one pixel illustrated in FIG. 7.

Referring to FIG. 8, the pixel PX may include a transistor TR and a light-emitting element OLED. The light-emitting element OLED may include a first electrode (e.g., an anode) AE, a second electrode (e.g., a cathode) CE, a hole control layer HCL, an electron control layer ECL, and an emissive layer EML. However, the invention is not limited thereto, and the first electrode AE may be the cathode and the second electrode CE may be the anode in another embodiment based on a structure of the pixel PX.

The transistor TR and the light-emitting element OLED may be disposed on a substrate SUB. Although one transistor TR is illustrated, the pixel PX may substantially include a plurality of transistors and at least one capacitor for driving the light-emitting element OLED.

The display area DA may include an emissive area PA corresponding to each of the pixels PX and a non-emissive area around the emissive area PA. The light-emitting element OLED may be disposed in the emissive area PA.

A buffer layer BFL may be disposed on the substrate SUB. The buffer layer BFL may be an inorganic layer. A semiconductor pattern may be disposed on the buffer layer BFL. The semiconductor pattern may include poly silicon, amorphous silicon, or metal oxide.

The semiconductor pattern may be doped with an N-type dopant or a P-type dopant. The semiconductor pattern may include a heavily doped area and a lightly doped area. The conductivity of the heavily doped area may be higher than the conductivity of the lightly doped area, and the heavily doped area may substantially serve as a source electrode and a drain electrode of the transistor TR The lightly doped area may substantially correspond to an active (or, channel) area of the transistor TR.

A source S, an active area A, and a drain D of the transistor TR may be formed or provided from the semiconductor pattern. A first insulating layer INS1 may be disposed on the semiconductor pattern. A gate G of the transistor TR may be disposed on the first insulating layer INS1. A second insulating layer INS2 may be disposed on the gate G. A third insulating layer INS3 may be disposed on the second insulating layer INS2.

A connecting electrode CNE for connecting the transistor TR and the light-emitting element OLED may include a first connecting electrode CNE1 and a second connecting electrode CNE2. The first connecting electrode CNE1 may be disposed on the third insulating layer INS3 and may be connected to the drain D through a first contact hole CH1 defined in the first, second, and third insulating layers INS1, INS2, and INS3.

A fourth insulating layer INS4 may be disposed on the first connecting electrode CNE1. A fifth insulating layer INS5 may be disposed on the fourth insulating layer INS4. The second connecting electrode CNE2 may be disposed on the fifth insulating layer INS5. The second connecting electrode CNE2 may be connected to the first connecting electrode CNE1 through a second contact hole CH2 defined in the fourth and fifth insulating layers INS4 and INS5.

A sixth insulating layer INS6 may be disposed on the second connecting electrode CNE2. The layers from the buffer layer BFL to the sixth insulating layer INS6 may be defined as a circuit element layer DP-CL. The first to sixth insulating layers INS1 to INS6 may be inorganic layers or organic layers.

The first electrode AE may be disposed on the sixth insulating layer INS6. The first electrode AE may be connected to the second connecting electrode CNE2 through a third contact hole CH3 defined in the sixth insulating layer INS6. A pixel defining film PDL in which an opening PX_OP for exposing a predetermined portion of the first electrode AE is defined may be disposed on the first electrode AE and the sixth insulating layer INS6.

The hole control layer HCL may be disposed on the first electrode AE and the pixel defining film PDL. The hole control layer HCL may include a hole transporting layer and a hole injection layer.

The emissive layer EML may be disposed on the hole control layer HCL. The emissive layer EML may be disposed in an area corresponding to the opening PX_OP. The emissive layer EML may include an organic material and/or an inorganic material. The emissive layer EML may generate any one of red light, green light, and blue light. However, the invention is not limited thereto, and the emissive layer EML may generate various other color light.

The electron control layer ECL may be disposed on the emissive layer EML and the hole control layer HCL. The electron control layer ECL may include an electron transporting layer and an electron injection layer. The hole control layer HCL and the electron control layer ECL may be commonly disposed in the emissive area PA and the non-emissive area NPA.

The second electrode CE may be disposed on the electron control layer ECL. The second electrode CE may be commonly disposed on the pixels PX. The layer including the light-emitting element OLED disposed therein may be defined as a display element layer DP-OLED.

A thin film encapsulation layer TFE may be disposed on the second electrode CE and may cover the pixel PX. The thin film encapsulation layer TFE may include a first encapsulation layer EN1 disposed on the second electrode CE, a second encapsulation layer EN2 disposed on the first encapsulation layer EN1, and a third encapsulation layer EN3 disposed on the second encapsulation layer EN2.

The first and third encapsulation layers EN1 and EN3 may include an inorganic insulating layer and may protect the pixel PX from moisture/oxygen. The second encapsulation layer EN2 may include an organic insulating layer and may protect the pixel PX from foreign matter such as dust particles.

A first voltage may be applied to the first electrode AE through the transistor TR, and a second voltage having a lower level than that of the first voltage may be applied to the second electrode CE. Holes and electrons injected into the emissive layer EML may be combined to form excitons, and the light-emitting element OLED may emit light as the excitons transition to a ground state.

The input sensing part ISP may be disposed on the thin film encapsulation layer TFE. The input sensing part ISP may be directly manufactured on an upper surface of the thin film encapsulation layer TFE.

A base layer BS may be disposed on the thin film encapsulation layer TFE. The base layer BS may include an inorganic insulating layer. At least one inorganic insulating layer may be provided on the thin film encapsulation layer TFE as the base layer BS.

The input sensing part ISP may include a first conductive pattern CTL1 and a second conductive pattern CTL2 disposed on the first conductive pattern CTL1. The first conductive pattern CTL1 may be disposed on the base layer BS. An insulating layer TINS may be disposed on the base layer BS to cover the first conductive pattern CTL1. The insulating layer TINS may include an inorganic insulating layer or an organic insulating layer. The second conductive pattern CTL2 may be disposed on the insulating layer TINS.

The first and second conductive patterns CTL1 and CTL2 may overlap the non-emissive area NPA. Although not illustrated, the first and second conductive patterns CTL1 and CTL2 may be disposed in the non-emissive area NPA between the emissive areas PA and may have a mesh shape.

The first and second conductive patterns CTL1 and CTL2 may form the above-described sensors of the input sensing part ISP. In an embodiment, the first and second conductive patterns CTL1 and CTL2 having a mesh shape may be separated from each other in a predetermined area to form the sensors, for example. Part of the second conductive pattern CTL2 may be connected to the first conductive pattern CTL1.

The anti-reflection layer RPL may be disposed on the second conductive pattern CTL2. The anti-reflection layer RPL may be directly manufactured on the second conductive pattern CTL2. The anti-reflection layer RPL may include a black matrix BM and a plurality of color filters CF. The black matrix BM may overlap the non-emissive area NPA, and the color filters CF may overlap the emissive areas PA.

The black matrix BM may be disposed on the insulating layer TINS to cover the second conductive pattern CTL2. Openings B_OP overlapping the emissive area PA and the opening PX_OP may be defined in the black matrix BM. The black matrix BM may absorb and block light.

The color filters CF may be disposed on the insulating layer TINS and the black matrix BM. The color filters CF may be disposed in the openings B_OP, respectively. A planarization insulating layer PINS may be disposed on the color filters CF. The planarization insulating layer PINS may provide a flat upper surface.

When external light travelling toward the display panel DP is reflected from the display panel DP and provided back to the user, the user may visually recognize the external light as in a mirror. To prevent such a phenomenon, the anti-reflection layer RPL may include the plurality of color filters CF that display the same colors as those of the pixels PX of the display panel DP. The color filters CF may filter external light with the same colors as those of the pixels PX. In this case, the external light may not be visible to the user.

However, without being limited thereto, the anti-reflection layer RPL may include a polarizer film for decreasing the reflectivity of external light. The polarizer film may be separately manufactured and may be attached to the input sensing part ISP by an adhesive layer. The polarizer film may include a phase retarder and/or a polarizer.

Figure 9:
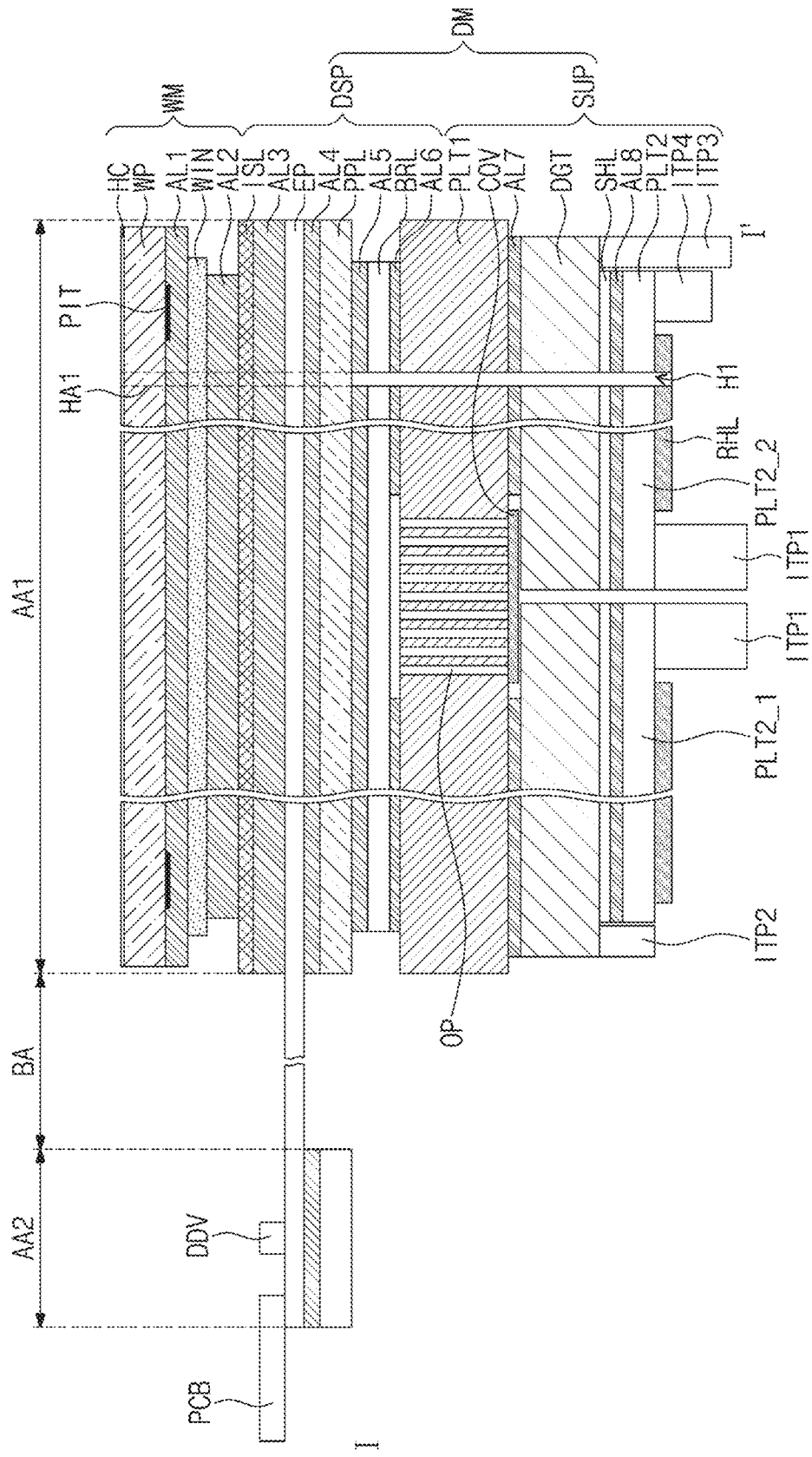
FIG. 9 is a cross-sectional view taken along line I-I' illustrated in FIG. 7.
Figure 10:
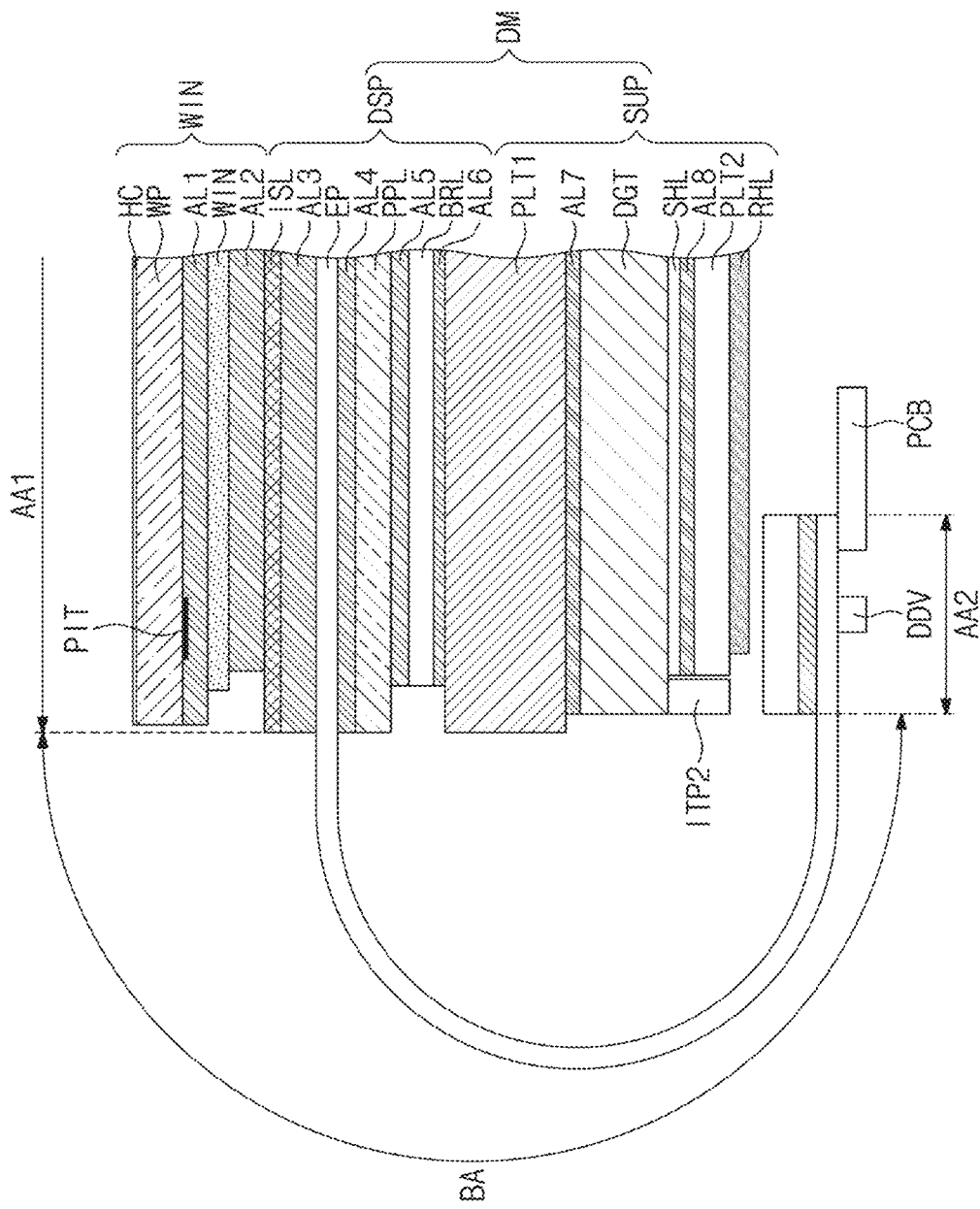
FIG. 10 is a view illustrating a state in which a bending area illustrated in FIG. 9 is bent.

FIG. 9 is a cross-sectional view taken along line I-I' illustrated in FIG. 7. FIG. 10 is a view illustrating a state in which the bending area illustrated in FIG. 9 is bent.

The section of the display module DM and the section of the window module WM that correspond to line I-I' are illustrated together in FIG. 9.

Referring to FIG. 9, the display device DD may include the display module DM and the window module WM disposed over the display module DM. The display module DM may be a flexible display module. The display module DM may include the first non-folding area NFA1, the folding area FA, and the second non-folding area NFA2.

The display module DM may include a display part DSP and a support part SUP. The support part SUP may be disposed under the display part DSP and may support the display part DSP.

The window module WM may include a window WIN, a window protection layer WP, a hard coating layer HC, and first and second adhesive layers AL1 and AL2. The display part DSP may include the electronic panel EP, a shock absorbing layer ISL, the panel protection layer PPL, a barrier layer BRL, and third to sixth adhesive layers AL3 to AL6. The configurations of the electronic panel EP and the panel protection layer PPL have been described above in detail with reference to FIG. 6, and therefore descriptions thereabout will be omitted.

The shock absorbing layer ISL may be disposed over the electronic panel EP. The shock absorbing layer ISL may protect the electronic panel EP by absorbing external shocks applied toward the electronic panel EP from above the display device DD. The shock absorbing layer ISL may be manufactured in the form of an oriented film.

The shock absorbing layer ISL may include a flexible plastic material. The flexible plastic material may be defined as a synthetic resin film. In an embodiment, the shock absorbing layer ISL may include a flexible plastic material such as polyimide ("PI") or polyethylene terephthalate ("PET"), for example.

The window WIN may be disposed over the shock absorbing layer ISL. The window WIN may protect the electronic panel EP from external scratches. The window WIN may have a property of being optically transparent. The window WIN may include glass. However, without being limited thereto, the window WIN may include a synthetic resin film.

The window WIN may have a multi-layer structure or a single layer structure. In an embodiment, the window WIN may include a plurality of synthetic resin films coupled by an adhesive, or may include a glass substrate and a synthetic resin film coupled by an adhesive, for example.

The window protection layer WP may be disposed over the window WIN. The window protection layer WP may include a flexible plastic material such as PI or PET. The hard coating layer HC may be disposed on an upper surface of the window protection layer WP.

A printed layer PIT may be disposed on a lower surface of the window protection layer WP. The printed layer PIT may be black in color, but the color of the printed layer PIT is not limited thereto. The printed layer PIT may be adjacent to the periphery of the window protection layer WP.

The barrier layer BRL may be disposed under the panel protection layer PPL. The barrier layer BRL may increase resistance to a compressive force caused by external pressing. Accordingly, the barrier layer BRL may serve to prevent deformation of the electronic panel EP. In an embodiment, the barrier layer BRL may include a flexible plastic material such as PI or PET.

The barrier layer BRL may have a color that absorbs light. In an embodiment, the barrier layer BRL may be black in color, for example. In this case, in a top view of the display module DM, components disposed under the barrier layer BRL may not be visible.

The first adhesive layer AL1 may be disposed between the window protection layer WP and the window WIN. The window protection layer WP and the window WIN may be bonded with each other by the first adhesive layer AL1. The first adhesive layer AL1 may cover the printed layer PIT.

The second adhesive layer AL2 may be disposed between the window WIN and the shock absorbing layer ISL. The window WIN and the shock absorbing layer ISL may be bonded with each other by the second adhesive layer AL2.

The third adhesive layer AL3 may be disposed between the shock absorbing layer ISL and the electronic panel EP. The shock absorbing layer ISL and the electronic panel EP may be bonded with each other by the third adhesive layer AL3.

The fourth adhesive layer AL4 may be disposed between the electronic panel EP and the panel protection layer PPL. The electronic panel EP and the panel protection layer PPL may be bonded with each other by the fourth adhesive layer AL4.

The fifth adhesive layer AL5 may be disposed between the panel protection layer PPL and the barrier layer BRL. The panel protection layer PPL and the barrier layer BRL may be bonded with each other by the fifth adhesive layer AL5.

The sixth adhesive layer AL6 may be disposed between the barrier layer BRL and the support part SUP. Specifically, a first support plate PLT1 of the support part SUP may be disposed under the barrier layer BRL, and the sixth adhesive layer AL6 may be disposed between the barrier layer BRL and the first support plate PLT1. The barrier layer BRL and the first support plate PLT1 may be bonded with each other by the sixth adhesive layer AL6.

Hereinafter, "thickness" may represent a numerical value measured in the third direction DR3, and "width" may represent a numerical value measured in the first or second direction DR1 or DR2 that is a horizontal direction.

The sixth adhesive layer AL6 may overlap the first and second non-folding areas NFA1 (refer to FIG. 7) and NFA2 (refer to FIG. 7) and may not overlap the folding area FA (refer to FIG. 7). That is, the sixth adhesive layer AL6 may not be disposed in the folding area FA. In an embodiment, an opening area of the sixth adhesive layer AL6 may have a width of about 9.65 millimeters.

In an embodiment, the first to sixth adhesive layers AL1 to AL6 may include a transparent adhesive such as a pressure sensitive adhesive ("PSA") or an optically clear adhesive ("OCA"), but are not limited thereto.

The thickness of the panel protection layer PPL may be smaller than the thickness of the window protection layer WP, and the thickness of the barrier layer BRL may be smaller than the thickness of the panel protection layer PPL. The thickness of the electronic panel EP may be smaller than the thickness of the barrier layer BRL and may be equal to the thickness of the window WIN. The thickness of the shock absorbing layer ISL may be smaller than the thickness of the electronic panel EP.

In an embodiment, the window protection layer WP may have a thickness of about 65 micrometers, and the panel protection layer PPL may have a thickness of about 50 micrometers, for example. In an embodiment, the barrier layer BRL may have a thickness of about 35 micrometers, and the electronic panel EP and the window WIN may have a thickness of about 30 micrometers. In an embodiment, the shock absorbing layer ISL may have a thickness of about 23 micrometers.

The thickness of the first adhesive layer AL1 may be equal to the thickness of the barrier layer BRL, and the thicknesses of the second adhesive layer AL2 and the third adhesive layer AL3 may be equal to the thickness of the panel protection layer PPL. The thickness of the fourth adhesive layer AL4 may be equal to the thickness of the fifth adhesive layer AL5.

The thicknesses of the fourth adhesive layer AL4 and the fifth adhesive layer AL5 may be smaller than the thickness of the electronic panel EP and may be greater than the thickness of the shock absorbing layer ISL. The thickness of the sixth adhesive layer AL6 may be smaller than the thickness of the shock absorbing layer ISL. The thickness of the hard coating layer HC may be smaller than the thickness of the sixth adhesive layer AL6.

In an embodiment, the first adhesive layer AL1 may have a thickness of about 35 micrometers, and the second adhesive layer AL2 and the third adhesive layer AL3 may have a thickness of about 50 micrometers, for example. In an embodiment, the fourth adhesive layer AL4 and the fifth adhesive layer AL5 may have a thickness of about 25 micrometers, and the sixth adhesive layer AL6 may have a thickness of about 16 micrometers. In an embodiment, the hard coating layer HC may have a thickness of about 5 micrometers.

The electronic panel EP, the shock absorbing layer ISL, the panel protection layer PPL, and the third and fourth adhesive layers AL3 and AL4 may have the same width as one another. The window protection layer WP and the first adhesive layer AL1 may have the same width as each other. The barrier layer BRL and the fifth and sixth adhesive layers AL5 and AL6 may have the same width as one another.

The widths of the electronic panel EP, the shock absorbing layer ISL, the panel protection layer PPL, and the third and fourth adhesive layers AL3 and AL4 may be greater than the widths of the window protection layer WP and the first adhesive layer AL1. The peripheries of the electronic panel EP, the shock absorbing layer ISL, the panel protection layer PPL, and the third and fourth adhesive layers AL3 and AL4 may be disposed outward of the peripheries of the window protection layer WP and the first adhesive layer AL1.

The widths of the window WIN and the second adhesive layer AL2 may be smaller than the widths of the window protection layer WP and the first adhesive layer AL1. The width of the second adhesive layer AL2 may be smaller than the width of the window WIN. The periphery of the window WIN may be disposed inward of the peripheries of the window protection layer WP and the first adhesive layer AL1. The periphery of the second adhesive layer AL2 may be disposed inward of the periphery of the window WIN.

The widths of the barrier layer BRL and the fifth and sixth adhesive layers AL5 and AL6 may be smaller than the widths of the window protection layer WP and the first adhesive layer AL1. The peripheries of the barrier layer BRL and the fifth and sixth adhesive layers AL5 and AL6 may be disposed inward of the peripheries of the window protection layer WP and the first adhesive layer AL1.

In an embodiment, the distance between the periphery of the electronic panel EP and the periphery of the window protection layer WP may be about 10 micrometers, for example. In an embodiment, the distance between the periphery of the electronic panel EP and the periphery of the window WIN may be about 220 micrometers. In an embodiment, the distance between the periphery of the window WIN and the periphery of the second adhesive layer AL2 may be about 190 micrometers.

The support part SUP may include the first support plate PLT1, a second support plate PLT2, a cover layer COV, a digitizer DGT, a shielding layer SHL, a heat radiating layer RHL, seventh and eighth adhesive layers AL7 and AL8, and first to fourth insulating tapes ITP1 to ITP4.

The first support plate PLT1 may be disposed under the electronic panel EP and may support the electronic panel EP. The first support plate PLT1 may have a higher rigidity than that of the display part DSP. The first support plate PLT1 may include a non-metallic material. In an embodiment, the first support plate PLT1 may include a fiber reinforced composite, for example. In an embodiment, the fiber reinforced composite may be carbon fiber reinforced plastic ("CFRP") or glass fiber reinforced plastic ("GFRP").

The first support plate PLT1 including the fiber reinforced composite may be lightened. The first support plate PLT1 including the fiber reinforced composite may be lighter than a metal support plate including a metallic material and may have a modulus and a rigidity similar to those of the metal support plate.

In addition, the first support plate PLT1 including the fiber reinforced composite may be more easily shaped than the metal support plate. In an embodiment, the first support plate PLT1 including the fiber reinforced composite may be more easily shaped through a laser process or a micro-blast process, for example.

A plurality of openings OP may be defined in the portion of the first support plate PLT1 that overlaps the folding area FA. The openings OP may be defined through portions of the first support plate PLT1 in the third direction DR3. The openings OP may be defined through the laser process or the micro-blast process mentioned above.

As the openings OP are defined in the portion of the first support plate PLT1 that overlaps the folding area FA, the flexibility of the portion of the first support plate PLT1 that overlaps the folding area FA may be increased. As a result, the first support plate PLT1 may be easily folded about the folding area FA. The predetermined shape of the openings OP will be described below in detail.

The width of the portion in which the openings OP are defined may be smaller than the width of the opening area of the sixth adhesive layer AL6. In an embodiment, the width of the portion in which the openings OP are defined may be about 8.34 millimeters, for example.

The cover layer COV may be disposed under the first support plate PLT1. The cover layer COV may cover the openings OP, which are defined in the first support plate PLT1, under the first support plate PLT1. The cover layer COV may overlap the folding area FA and may not overlap the first and second non-folding areas NFA1 and NFA2. That is, the cover layer COV may not be disposed in the first and second non-folding areas NFA1 and NFA2. The cover layer COV may contact a lower surface of the portion of the first support plate PLT1 in which the openings OP are defined.

The cover layer COV may have a lower elastic modulus than that of the first support plate PLT1. In an embodiment, the cover layer COV may include thermoplastic poly-ure-thane or rubber, for example, but is not limited thereto. The cover layer COV may be manufactured in a sheet form and may be attached to the first support plate PLT1. In an embodiment, the cover layer COV may have a width of about 10.65 millimeters, for example.

The digitizer DGT may be disposed under the first support plate PLT1. The cover layer COV may be disposed between the first support plate PLT1 and the digitizer DGT. The cover layer COV may be spaced apart from an upper surface of the digitizer DGT.

The digitizer DGT is a device that receives an input of position information that the user instructs on the display surface. The digitizer DGT may be implemented in an electromagnetic type (or, an electromagnetic resonance type). In an embodiment, the digitizer DGT may include a digitizer sensor substrate (not illustrated) that includes a plurality of coils, for example. However, without being limited thereto, the digitizer DGT may be implemented in an active electrostatic type.

When the user moves a pen on the display device DD, the pen may be driven by an AC signal to cause an oscillating magnetic field, and the oscillating magnetic field may induce a signal in the coils. The position of the pen may be detected through the signal induced in the coils. The digitizer DGT may recognize the position of the pen by sensing an electromagnetic change generated by access of the pen.

When the first support plate PLT1 disposed over the digitizer DGT and adjacent to the digitizer DGT includes metal, the sensitivity of the digitizer DGT may be lowered by the metal. In an embodiment, when a signal transmitted on the display device DD is blocked due to signal interference by a metal support plate, the digitizer DGT may not normally operate, for example. However, in an embodiment of the invention, the first support plate PLT1 disposed over the digitizer DGT includes the non-metallic fiber reinforced composite, and thus the digitizer DGT may normally operate.

The digitizer DGT may be divided into two parts in the folding area FA. The separated parts of the digitizer DGT may be connected to a digitizer driver (not illustrated) through flexible circuit boards.

The shielding layer SHL may be disposed under the digitizer DGT. The shielding layer SHL may include metal. In an embodiment, the shielding layer SHL may include copper, for example, but is not limited thereto. The shielding layer SHL may be divided into two parts in the folding area FA. The separated parts of the shielding layer SHL may be disposed under the separated parts of the digitizer DGT, respectively.

The shielding layer SHL may shield electromagnetism that is applied to the digitizer DGT from below the display device DD. The shielding layer SHL may be defined as an electromagnetic shielding layer. The shielding layer SHL including the metal may serve as a heat radiating layer.

The second support plate PLT2 may be disposed under the shielding layer SHL. The second support plate PLT2 may have a higher rigidity than that of the display part DSP. In an embodiment, the second support plate PLT2 may include a metallic material such as stainless steel (e.g., SUS 316). However, without being limited thereto, the second support plate PLT2 may include a non-metallic material such as plastic.

The second support plate PLT2 may be divided into two parts in the folding area FA. In an embodiment, the second support plate PLT2 may include a second_first support plate PLT2_1 overlapping the first non-folding area NFA1 and a second_second support plate PLT2_2 overlapping the second non-folding area NFA2, for example.

The second_first support plate PLT2_1 may support the first non-folding area NFA1. The second_second support plate PLT2_2 may support the second non-folding area NFA2. The second_first support plate PLT2_1 and the second_second support plate PLT2_2 may extend to the folding area FA and may be adjacent to each other in the folding area FA.

The second_first support plate PLT2_1 and the second_second support plate PLT2_2 may be spaced apart from each other under the folding area FA. In an embodiment, the gap between the second_first support plate PLT2_1 and the second_second support plate PLT2_2 in the horizontal direction may range from about 0.4 millimeter to about 2 millimeter, for example.

The second_first support plate PLT2_1 and the second_second support plate PLT2_2 may support the portion of the first support plate PLT1, in which the openings OP are defined, under the folding area FA. When pressure is applied to the first support plate PLT1 from above, deformation of the portion of the first support plate PLT1 in which the openings OP are defined may be prevented by the second_first support plate PLT2_1 and the second_second support plate PLT2_2. Additionally, the second_first support plate PLT2_1 and the second_second support plate PLT2_2 may perform a function of radiating heat.

The heat radiating layer RHL may be disposed under the second support plate PLT2. The heat radiating layer RHL may be divided into two parts in the folding area FA. The separated parts of the heat radiating layer RHL may be disposed under the second_first support plate PLT2_1 and the second_second support plate PLT2_2, respectively.

The heat radiating layer RHL may perform a function of radiating heat. In an embodiment, the heat radiating layer RHL may include graphite, for example, but is not limited thereto. The heat radiating layer RHL may perform a heat radiating function together with the second support plate PLT2 and the shielding layer SHL, and thus heat radiating performance of the display device DD may be improved.

The first to fourth insulating tapes ITP1 to ITP4 may be disposed under the digitizer DGT and the second support plate PLT2. The first to fourth insulating tapes ITP1 to ITP4 may include an insulating material.

Two first insulating tapes ITP1 may be disposed under the second_first support plate PLT2_1 and the second_second support plate PLT2_2, respectively, so as to be adjacent to one side (e.g., right side in FIG. 9) of the second_first support plate PLT2_1 and one side (e.g., left side in FIG. 9) of the second_second support plate PLT2_2 facing each other.

The second insulating tape ITP2 and the third insulating tape ITP3 may be disposed under the digitizer DGT so as to be adjacent to opposite sides of the digitizer DGT. The second insulating tape ITP2 may be adjacent to the periphery of the second_first support plate PLT2_1, and the third insulating tape ITP3 may be adjacent to the periphery of the second_second support plate PLT2_2.

The fourth insulating tape ITP4 may be adjacent to an opposite side (e.g., right side in FIG. 9) of the second_second support plate PLT2_2 that is opposite to the one side of the second_second support plate PLT2_2. The fourth insulating tape ITP4 may be disposed under the second_second support plate PLT2_2.

The shielding layer SHL, the second support plate PLT2, the heat radiating layer RHL, the first insulating tapes ITP1, and the fourth insulating tape ITP4 may be disposed between the second insulating tape ITP2 and the third insulating tape ITP3. One of the separated parts of the heat radiating layer RHL may be disposed between the first insulating tape ITP1 and the fourth insulating tape ITP4 that are disposed under the second_second support plate PLT2_2. The other one of the separated parts of the heat radiating layer RHL may be disposed between the first insulating tape ITP1 disposed under the second_first support plate PLT2_1 and the second insulating tape ITP2 disposed under the digitizer DGT.

Although not illustrated, when the electronic device ED is folded, magnets may be disposed under the display module DM to maintain the folded state of the electronic device ED. The magnets may be adjacent to the periphery of the electronic device ED. The folded state of the electronic device ED may be maintained by magnetic forces of the magnets.

When the magnetism of the magnets is delivered to the digitizer DGT, the digitizer DGT may not normally operate. The first to fourth insulating tapes ITP1 to ITP4 may prevent delivery of the magnetism of the magnets disposed adjacent to the periphery of the electronic device ED to the digitizer DGT. The first to fourth insulating tapes ITP1 to ITP4 may be defined as magnetism shielding tapes.

The seventh adhesive layer AL7 may be disposed between the first support plate PLT1 and the digitizer DGT. The first support plate PLT1 and the digitizer DGT may be bonded with each other by the seventh adhesive layer AL7. The seventh adhesive layer AL7 may not be disposed in the folding area FA. That is, the seventh adhesive layer AL7 may be open in the folding area FA. The above-described cover layer COV may be disposed in the opening of the seventh adhesive layer AL7. Because the seventh adhesive layer AL7 is not disposed under the folding area FA, a folding motion of the support part SUP may be more easily performed.

The eighth adhesive layer AL8 may be disposed between the shielding layer SHL and the second support plate PLT2. The shielding layer SHL and the second support plate PLT2 may be bonded with each other by the eighth adhesive layer AL8. The eighth adhesive layer AL8 may be divided into two parts in the folding area FA. One of the separated parts of the eighth adhesive layer AL8 may be disposed between one of the separated parts of the shielding layer SHL and the second_first support plate PLT2_1, and the other one of the separated parts of the eighth adhesive layer AL8 may be disposed between the other one of the separated parts of the shielding layer SHL and the second_second support plate PLT2_2. The eighth adhesive layer AL8 may be disposed between the second insulating tape ITP2 and the third insulating tape ITP3.

The width of the first support plate PLT1 may be substantially the same as the width of the electronic panel EP. The widths of the digitizer DGT and the seventh adhesive layer AL7 may be smaller than the width of the first support plate PLT1. The peripheries of the digitizer DGT and the seventh adhesive layer AL7 may be disposed inward of the periphery of the first support plate PLT1.

The widths of the shielding layer SHL, the eighth adhesive layer AL8, and the second support plate PLT2 may be smaller than the width of the digitizer DGT. The peripheries of the shielding layer SHL, the eighth adhesive layer AL8, and the second support plate PLT2 may be disposed inward of the periphery of the digitizer DGT.

The thickness of the first support plate PLT1 may be greater than the thickness of the digitizer DGT, and the thickness of the digitizer DGT may be greater than the thickness of the second support plate PLT2. The thickness of the second support plate PLT2 may be greater than the thickness of the heat radiating layer RHL, and the thickness of the heat radiating layer RHL may be greater than the thicknesses of the seventh and eighth adhesive layers AL7 and AL8.

The thicknesses of the seventh and eighth adhesive layers AL7 and AL8 may be greater than the thickness of the shielding layer SHL, and the thickness of the shielding layer SHL may be greater than the thickness of the cover layer COV. The thickness of the cover layer COV may be equal to the thickness of the sixth adhesive layer AL6.

In an embodiment, the first support plate PLT1 may have a thickness of about 170 micrometers, the digitizer DGT may have a thickness of about 123.5 micrometers, and the second support plate PLT2 may have a thickness of about 50 micrometers, for example. In an embodiment, the shielding layer SHL may have a thickness of about 17 micrometers, and the heat radiating layer RHL may have a thickness of about 27 micrometers. In an embodiment, the seventh and eighth adhesive layers AL7 and AL8 may have a thickness of about 20 micrometers, and the cover layer COV may have a thickness of about 16 micrometers.

The thicknesses of the first insulating tapes ITP1 may be smaller than the thickness of the first support plate PLT1 and may be greater than the thickness of the digitizer DGT. The thickness of the third insulating tape ITP3 may be greater than the thickness of the first support plate PLT1. The thickness of the fourth insulating tape ITP4 may be smaller than the thicknesses of the first insulating tapes ITP1. The thickness of the second insulating tape ITP2 may be smaller than the thickness of the fourth insulating tape ITP4.

In an embodiment, the first insulating tapes ITP1 may have a thickness of about 145 micrometers, the second insulating tape ITP2 may have a thickness of about 87 micrometers, the third insulating tape ITP3 may have a thickness of about 206 micrometers, and the fourth insulating tape ITP4 may have a thickness of about 90 micrometers, for example.

The seventh and eighth adhesive layers AL7 and AL8 may include a PSA or an OCA, but are not limited thereto.

A first hole H1 may be defined in the portion of the display module DM that overlaps the first hole area HA1. The first hole H1 may be defined in the layers from the heat radiating layer RHL to the layer under the panel protection layer PPL. In an embodiment, the first hole H1 may be integrally defined in the barrier layer BRL, the first support plate PLT1, the digitizer DGT, the shielding layer SHL, the second support plate PLT2, the heat radiating layer RHL, and the fifth to eighth adhesive layers AL5 to AL8, for example.

Although not illustrated, a second hole may be defined in the portion of the display module DM that overlaps the second hole area HA2. Likewise to the first hole H1, the second hole may be defined in the layers from the heat radiating layer RHL to the layer under the panel protection layer PPL. The above-described camera CA may be disposed in the first hole H1, and the above-described sensor SN may be disposed in the second hole.

Referring to FIG. 10, the panel protection layer PPL and the fourth adhesive layer AL4 may not be disposed under the bending area BA. The panel protection layer PPL and the fourth adhesive layer AL4 may be disposed under the second area AA2 of the electronic panel EP. The data driver DDV may be disposed on the second area AA2 of the electronic panel EP.

A printed circuit board PCB may be connected to the second area AA2 of the electronic panel EP. The printed circuit board PCB may be connected to one side of the second area AA2. As the bending area BA is bent, the second area AA2 may be disposed under the first area AA1. Accordingly, the data driver DDV and the printed circuit board PCB may be disposed under the first area AA1.

Figure 11:
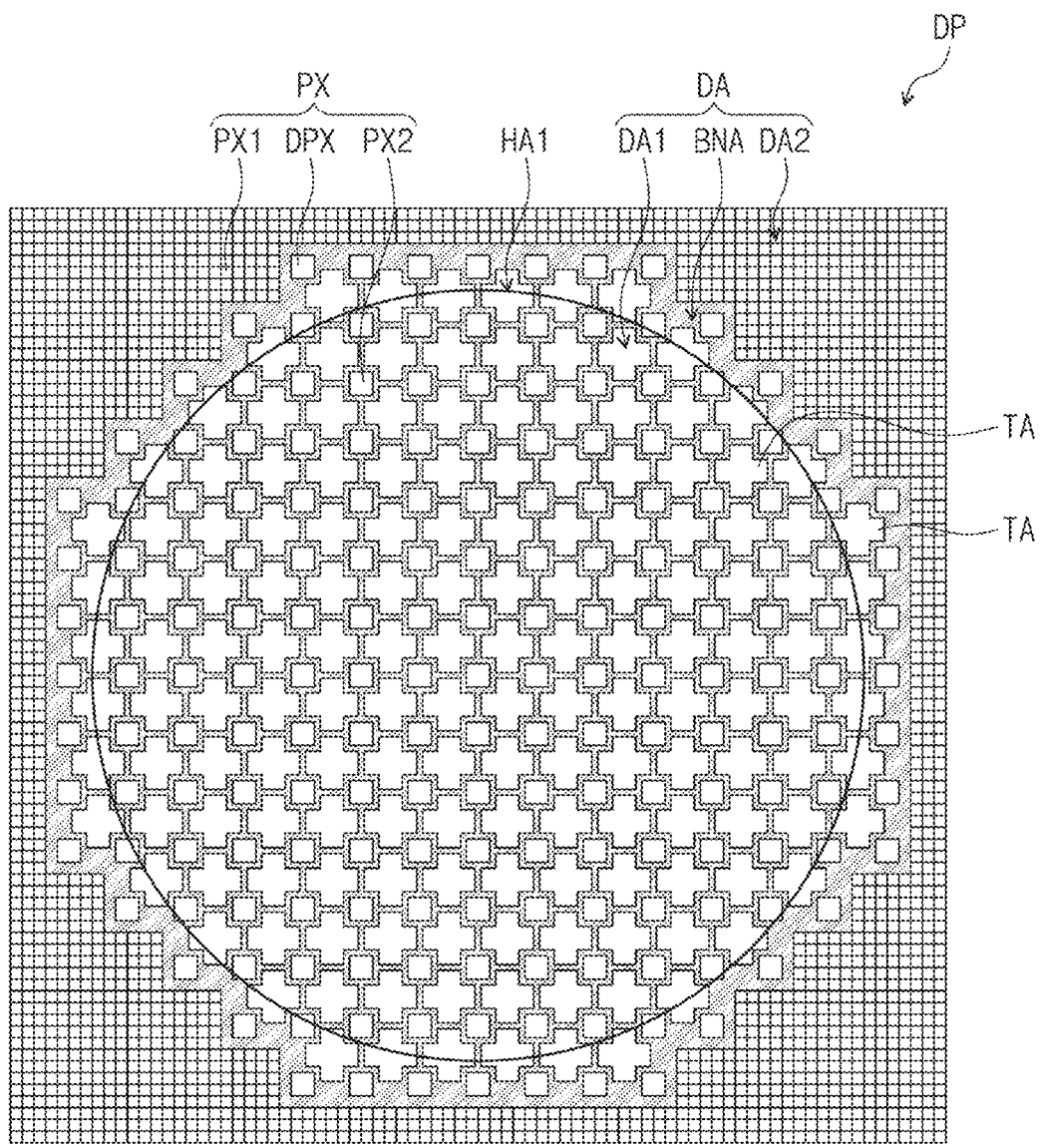
FIG. 11 is an enlarged plan view of a first hole area of the display panel illustrated in FIG. 9.
Figure 11:
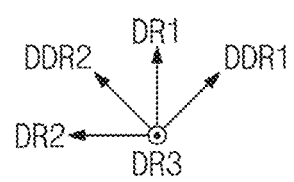

FIG. 11 is an enlarged plan view of the first hole area of the display panel illustrated in FIG. 9.

Although a planar configuration of the first hole area HA' is illustrated, a planar configuration of the second hole area HA2 may be substantially the same as that of the first hole area HA1.

Referring to FIG. 11, the display area DA may include a first display area DA1, a second display area DA2 around the first display area DA1, and a boundary area BNA between the first display area DA1 and the second display area DA2. The first display area DA1 may be defined by the first hole area HA1.

Pixels PX may include a plurality of first pixels PX1, a plurality of second pixels PX2, and a plurality of dummy pixels DPX. The first pixels PX1 may be disposed in the second display area DA2. The second pixels PX2 may be disposed in the first display area DA1. The dummy pixels DPX may be disposed in the boundary area BNA. In an embodiment, the boundary area BNA adjacent to the second display area DA2 may have a substantially octagonal shape, for example. However, the shape of the boundary area BNA is not limited thereto.

In an embodiment, the second pixels PX2 may be arranged in the first direction DR1 and the second direction DR2 in the first display area DA1, for example. However, the arrangement of the second pixels PX2 is not limited thereto. The dummy pixels DPX may be disposed along the boundary area BNA to surround the first display area DA1. In an embodiment, the second pixels PX2 and the dummy pixels DPX may each include a plurality of sub-pixels displaying red, green, and blue colors. However, the invention is not limited thereto, and the second pixels PX2 and the dummy pixels DPX may each include a plurality of sub-pixels displaying various other colors. The first pixels PX1 and the sub-pixels may substantially have the structure illustrated in FIG. 8.

The first display area DA1 may display an image through the second pixels PX2. The second display area DA2 may display an image through the first pixels PX1. The boundary area BNA may display an image through the dummy pixels DPX. Accordingly, a predetermined image may be displayed in the display area DA by light generated from the first pixels PX1, the second pixels PX2, and the dummy pixels DPX.

The display panel DP may include a plurality of light transmitting areas TA overlapping the first hole area HA1. The light transmitting areas TA may be disposed among the second pixels PX2. Furthermore, the light transmitting areas TA may be disposed between the dummy pixels DPX and the second pixels PX2 adjacent to the dummy pixels DPX.

In an embodiment, the light transmitting areas TA may have a cross shape, for example. However, the shape of the light transmitting areas TA is not limited thereto. The light transmitting areas TA may be disposed around each of the second pixels PX2. The light transmitting areas TA may be disposed in a first diagonal direction DDR1 and a second diagonal direction DDR2 with respect to each of the second pixels PX2.

The first diagonal direction DDR1 may be defined as a direction intersecting the first and second directions DR1 and DR2 in the plan view defined by the first and second directions DR1 and DR2. The second diagonal direction DDR2 may be defined as a direction intersecting the first diagonal direction DDR1 in the plan view defined by the first and second directions DR1 and DR2. In an embodiment, the first and second directions DR1 and DR2 may intersect each other at a right angle, and the first and second diagonal directions DDR1 and DDR2 may intersect each other at a right angle, for example.

The light transmitting areas TA may have a higher light transmittance than those of the first and second pixels PX1 and PX2 and the dummy pixels DPX. Light (the above-described optical signal) transmitting through the light transmitting areas TA may be incident on the camera CA disposed under the first display area DA1. That is, the light transmittance of the first hole area HA1 may be improved by the light transmitting areas TA, and light may be incident on the camera CA through the first hole area HA1. Accordingly, the first display area DA1 may display an image, and additionally, light passing through the first display area DA1 may be incident on the camera CA so that the camera CA may take an image.

Figure 12:
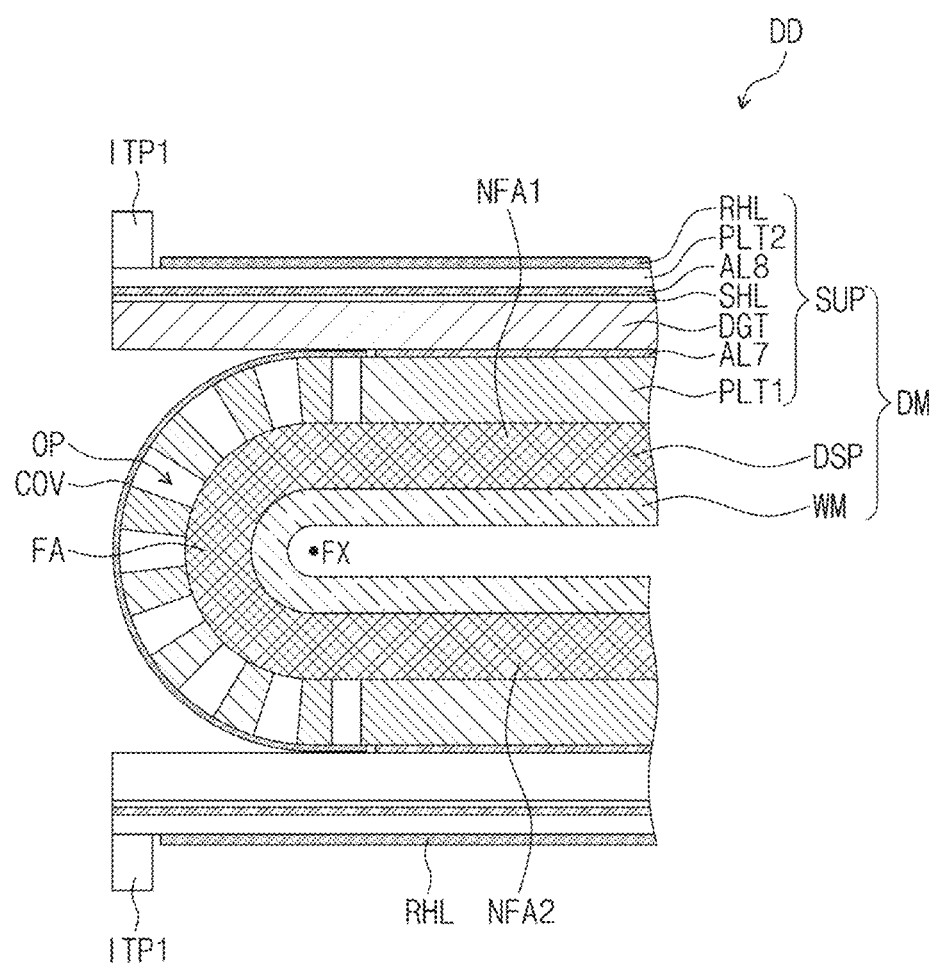
FIG. 12 is a view illustrating a folded state of a display device illustrated in FIG. 9.

FIG. 12 is a view illustrating a folded state of the display device illustrated in FIG. 9.

For convenience of description, the bending area BA and the second area AA2 of the electronic panel EP illustrated in FIG. 9 are omitted in FIG. 12.

Referring to FIG. 12, the display device DD may be folded about the folding axis FX in an in-folding manner. The folding area FA may be bent, and thus the first non-folding area NFA1 and the second non-folding area NFA2 may face each other. The display device DD may be changed from a first state (a flat state) illustrated in FIG. 9 to a second state (a folded state) illustrated in FIG. 12, or may be changed from the second state to the first state. Such a folding motion may be repeatedly performed.

The folding area FA of the display module DM may be easily bent because the display module DM is a flexible display module. The plurality of openings OP overlapping the folding area FA may be defined in the first support plate PLT1. Accordingly, in a folding motion, the portion of the first support plate PLT1 that overlaps the folding area FA may be easily bent by the openings OP.

The cover layer COV may contact the first support plate PLT1 without contacting the digitizer DGT. When the display device DD is folded, the separated parts of the digitizer DGT may move away from each other. In a case that the cover layer COV is attached to both of the first support plate PLT1 and the digitizer DGT, the separated parts of the digitizer DGT may not be spaced apart from each other due to the adhesive force between the digitizer DGT and the cover layer COV when the display device DD is folded. Accordingly, a folding motion of the digitizer DGT may be difficult.

In an embodiment of the invention, the cover layer COV may be attached to only the first support plate PLT1 without being attached to the digitizer DGT, and thus the display device DD may be easily folded.

Figure 13:
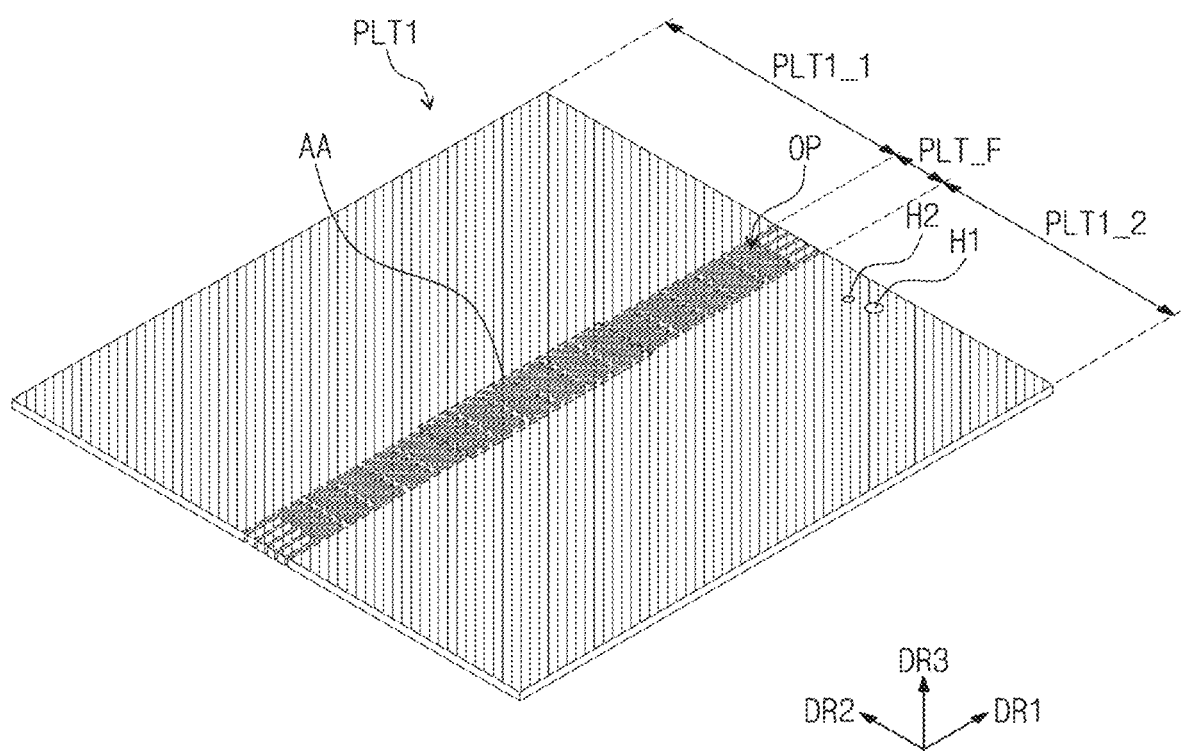
FIG. 13 is a perspective view of a first support plate illustrated in FIG. 9.

FIG. 13 is a perspective view of the first support plate illustrated in FIG. 9.

Referring to FIG. 13, the first support plate PLT1 may include a first_first plate PLT1_1, a first_second plate PLT1_2, and a folding plate PLT_F. The folding plate PLT_F may be disposed between the first_first plate PLT1_1 and the first_second plate PLT1_2. The first_first plate PLT1_1 and the first_second plate PLT1_2 may overlap the first non-folding area NFA1 and the second non-folding area NFA2, which are illustrated in FIG. 12, respectively. The folding plate PLT_F may overlap the folding area FA illustrated in FIG. 12.

A grid pattern may be defined in the folding plate PLT_F. In an embodiment, the plurality of openings OP may be defined in the folding plate PLT_F, for example. The openings OP may be arranged according to a predetermined rule. The openings OP may be arranged in a grid form to form the grid pattern in the folding plate PLT_F.

As the openings OP are defined in the folding plate PLT_F, the area of the folding plate PLT_F may be decreased, and thus the rigidity of the folding plate PLT_F may be lowered. Accordingly, when the openings OP are defined in the folding plate PLT_F, the flexibility of the folding plate PLT_F may be improved, as compared with a case when the openings OP are not defined in the folding plate PLT_F. As a result, the folding plate PLT_F may be more easily folded.

The first hole H1 and the second hole H2 described above may be defined in the first_second plate PLT1_2. The first hole H1 and the second hole H2 may be adjacent to the periphery of the first_second plate PLT1_2.

Figure 14:
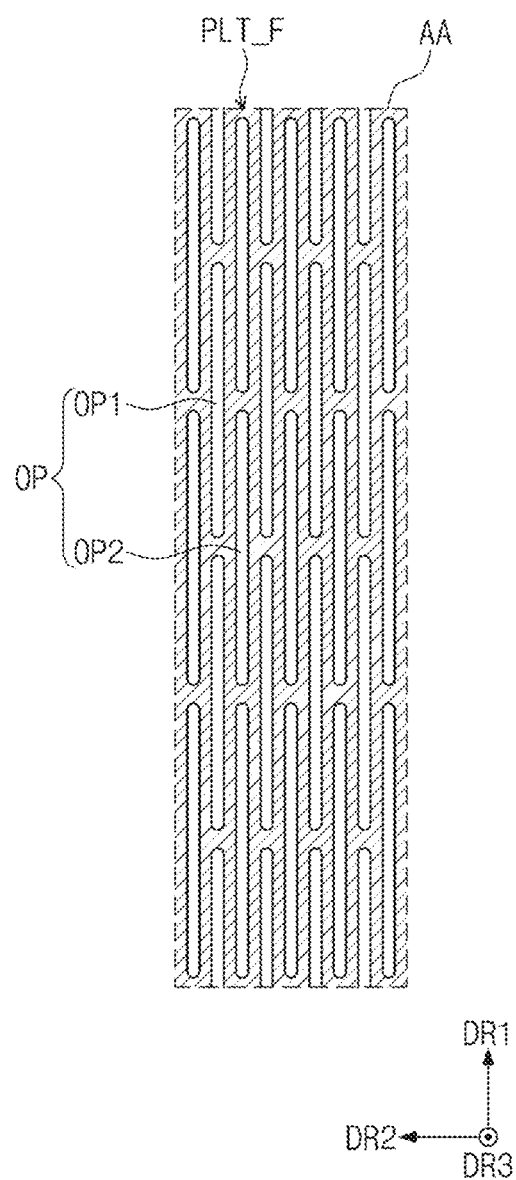
FIG. 14 is an enlarged plan view of area AA illustrated in FIG. 13.

FIG. 14 is an enlarged plan view of area AA illustrated in FIG. 13.

Referring to FIG. 14, the openings OP may be arranged in the first direction DR1 and the second direction DR2. The openings OP may extend longer in the first direction DR1 than in the second direction DR2. That is, the openings OP may extend in a direction parallel to the above-described folding axis FX.

The openings OP may include a plurality of first openings OP1 arranged in the first direction DR1 and a plurality of second openings OP2 arranged in the first direction DR1 and adjacent to the first openings OP1 in the second direction DR2. The first openings OP1 may be staggered with respect to the second openings OP2.

Figure 15:
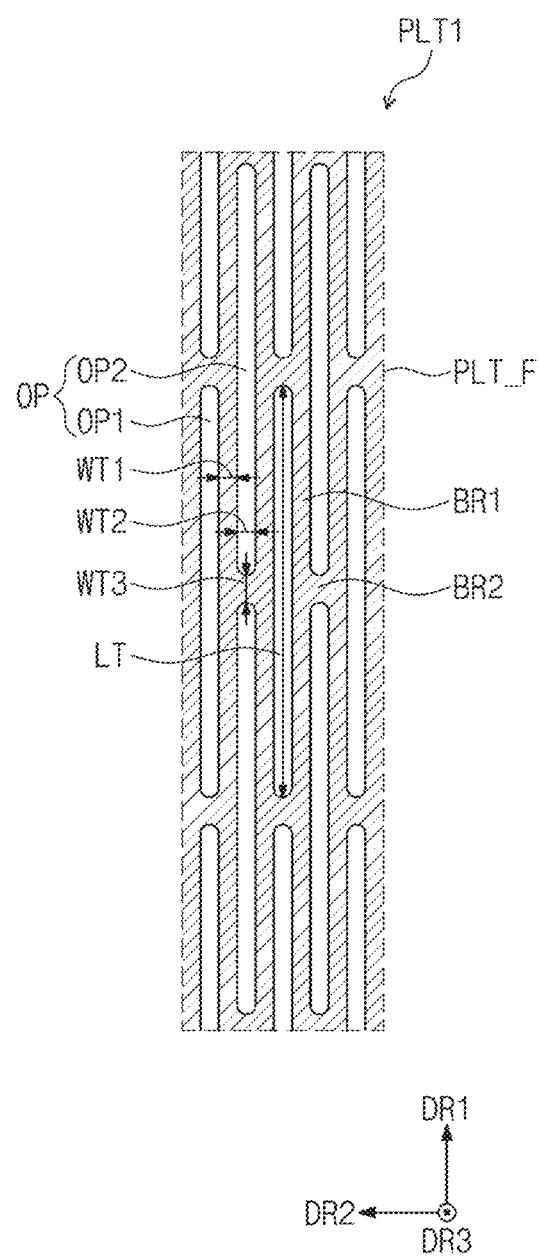
FIG. 15 is an enlarged view of first and second openings illustrated in FIG. 14.

FIG. 15 is an enlarged view of the first and second openings illustrated in FIG. 14.

Referring to FIG. 15, the first and second openings OP1 and OP2 defined in the folding plate PLT_F of the first support plate PLT1 may be defined through a laser process or a micro-blast process.

The first support plate PLT1 may include first branches BR1 between the openings OP adjacent to each other in the second direction DR2 and second branches BR2 between the openings OP adjacent to each other in the first direction DR1. The first branches BR1 may extend in the first direction DR1, and the second branches BR2 may extend in the second direction DR2. The openings OP may be defined by the first and second branches BR1 and BR2.

The width of each of the first branches BR1 in the second direction DR2 is defined as a first width WT1, and the width of each of the openings OP in the second direction DR2 is defined as a second width WT2. The width of each of the second branches BR2 in the first direction DR1 is defined as a third width WT3. The length LT of each of the openings OP in the first direction DR1 may be greater than the first width WT1, the second width WT2, and the third width WT3.

In the case of fiber processing rather than metal working, a laser process or a micro-blast process may be used. In such a process, process time for precision processing may increase when the openings OP are defined such that the first width WT1 of each of the first branches BR1 is too small. Furthermore, when the first width WT1 is too small, the first branches BR1 may be damaged so that the openings OP adjacent to each other in the second direction DR2 may be connected with each other.

Accordingly, to reduce process time without damage to the first branches BR1 in the process, the first branches BR1 are desired to have a width greater than a predetermined width. In an embodiment, when the first width WT1 is greater than about 0.13 millimeter, the first branches BR1 may be processed without damage, for example. In an embodiment of the invention, the first width WT1 may be greater than about 0.13 millimeter and less than about 0.4 millimeter.

A folding motion of the first support plate PLT1 may be related to the first width WT1 of each of the first branches BR1 and the second width WT2 of each of the openings OP. When the second width WT2 is greater than the first width WT1, that is, when the openings OP have a greater width than the first branches BR1, the folding plate PLT_F may be more easily folded. Accordingly, in an embodiment of the invention, the first width WT1 may be smaller than the second width WT2. In an embodiment, in an embodiment of the invention, a value obtained by dividing the second width WT2 by the first width WT1 may be greater than about 1.1 and less than about 2.0, for example.

When the third width WT3 of the second branches BR2 is too small, process time for precision processing may increase, or the second branches BR2 may be damaged so that the openings OP adjacent to each other in the first direction DR1 may be connected with each other. When the third width WT3 of the second branches BR2 is equal to or greater than the second width WT2 of the openings OP, the openings OP may be normally defined without damage to the second branches BR2.

The flexibility of the folding plate PLT_F is desired to be increased to facilitate a folding motion of the first support plate PLT1. The flexibility of the folding plate PLT_F may be increased as the length LT and the second width WT2 of the openings OP are increased. However, when the length LT and the second width WT2 of the openings OP are excessively increased, the grid pattern of the folding plate PLT_F in which the openings OP are defined may be visible from the outside.

Furthermore, when the first width WT1 of the first branches BR1 is too large compared to the length LT of the openings OP, the folding plate PLT_F may be damaged (e.g., cracked) by stress generated in the first branches BR1 in a folding motion. In an embodiment of the invention, to solve the problems of the visibility and the damage, a value obtained by dividing the length LT of the openings OP by the first width WT1 of the first branches BR1 may be equal to or greater than about 35.

Table 1 below shows test results of the display device DD for various first widths WT1, second widths WT2, third widths WT3, and lengths LT. The tests were conducted on the display device DD unfolded after being maintained in a folded state for about 24 hours at a temperature of about 60 degrees Celsius (° C.) and a humidity of about 93 percent (%).

The term "damage" in Table 1 may indicate a state in which the folding plate PLT_F having the grid pattern formed or provided therein is damaged. That is, the term "damage" may indicate a state in which the folding plate PLT_F is damaged in a process of forming the grid pattern. The term "visible" in Table 1 may indicate whether flexure depending on the grid pattern is visible from outside the display device DD in a top view of the upper surface of the display device DD. The term "crack" in Table 1 may indicate cracks in the folding plate PLT_F due to a folding motion.

TABLE 1

| Data | 1 | 2 | 3 | 4 | 5 | 6 |
|---|---|---|---|---|---|---|
| WT1 | 0.1 (Damage) | 0.13 (Damage) | 0.126 (Damage) | 0.13 (Damage) | 0.17 | 0.37 |
| WT2 | 0.15 | 0.18 | 0.23 | 0.28 | 0.28 | 0.4 |
| WT3 | 0.2 | 0.3 | 0.3 | 0.3 | 0.4 | 0.5 |
| LT | 5.5 | 6 | 8 | 7.5 | 12 | 13 |
| LT/WT1 | 55 | 46 | 63 | 58 | 71 | 35 |
| WT2/WT1 | 1.5 (Visible) | 1.4 (Visible) | 1.8 (Visible) | 2.2 (Visible) | 1.6 | 1.1 (Visible) |

| Data | 7 | 8 | 9 | 10 | 11 | 12 |
|---|---|---|---|---|---|---|
| WT1 | 0.15 | 0.17 | 0.2 | 0.22 | 0.25 | 0.15 |
| WT2 | 0.17 | 0.2 | 0.23 | 0.2 | 0.2 | 0.3 |
| WT3 | 0.2 | 0.2 | 0.3 | 0.2 | 0.2 | 0.2 |
| LT | 6 | 7.1 | 8 | 7 | 6.5 | 4 |
| LT/WT1 | 40 | 42 | 40 | 32 (Crack) | 26 (Crack) | 27 (Crack) |
| WT2/WT1 | 1.1 (Visible) | 1.2 | 1.2 | 0.9 (Visible) | 0.8 (Visible) | 2.0 (Visible) |

Referring to Table 1, in the case of data 1, 2, 3, and 4, problems of "damage" and "visible" may occur. When the grid pattern is formed or provided to have dimensions of data 1, 2, 3, and 4, for example, the grid pattern of the first plate PLT1 may be damaged in a process. The damage may indicate damage to the first branches BR1 as described above.

Furthermore, even when a normal grid pattern is formed or provided by applying the dimensions of data 1, 2, 3, and 4, flexure of the display device DD depending on the grid pattern may be visible from outside the display device DD. In addition, in the case of data 1, 2, 3, and 4, a problem in which process time increases due to precision processing may occur. Therefore, data 1, 2, 3, and 4 may not be suitable for forming the grid pattern in the folding plate PLT_F.

Even in the case of data 6, 7, 10, 11, and 12, flexure of the display device DD depending on the grid pattern may be visible from outside the display device DD. In the case of data 10, 11, and 12, the folding plate PLT_F having the grid pattern formed or provided therein may be cracked in a folding motion.

Under the condition where the first width WT1 is greater than about 0.13 millimeter and the second width WT2 is greater than the first width WT1, a value obtained by dividing the second width WT2 by the first width WT1 may be greater than about 1.1 and less than about 2.0, and a value obtained by dividing the length LT of the openings OP by the first width WT1 of the first branches BR1 may be equal to or greater than about 35. In this case, problems of "damage", "visible", and "crack" may not occur. That is, in the case of data 5, 8, and 9, problems of "damage", "visible", and "crack" may not occur.

Accordingly, in an embodiment of the invention, to form the grid pattern in the folding plate PLT_F, the first width WT1 may be set to be greater than about 0.13 millimeter, a value obtained by dividing the second width WT2 by the first width WT1 may be set to be greater than about 1.1 and less than about 2.0, and a value obtained by dividing the length LT of the openings OP by the first width WT1 of the first branches BR1 may be set to be equal to or greater than about 35. In the case of data 5, 8, and 9 that satisfy the three conditions, problems of "damage", "visible", and "crack" may not occur.

In the case of data 5, the first width WT1 may be about 0.17 millimeter, the second width WT2 may be about 0.28 millimeter, the third width WT3 may be about 0.4 millimeter, and the length LT may be about 12 millimeters. In the case of data 8, the first width WT1 may be about 0.17 millimeter, the second width WT2 may be about 0.2 millimeter, the third width WT3 may be about 0.2 millimeter, and the length LT may be about 7.1 millimeters. In the case of data 9, the first width WT1 may be about 0.2 millimeter, the second width WT2 may be about 0.23 millimeter, the third width WT3 may be about 0.3 millimeter, and the length LT may be about 8 millimeters.

Figure 16A:
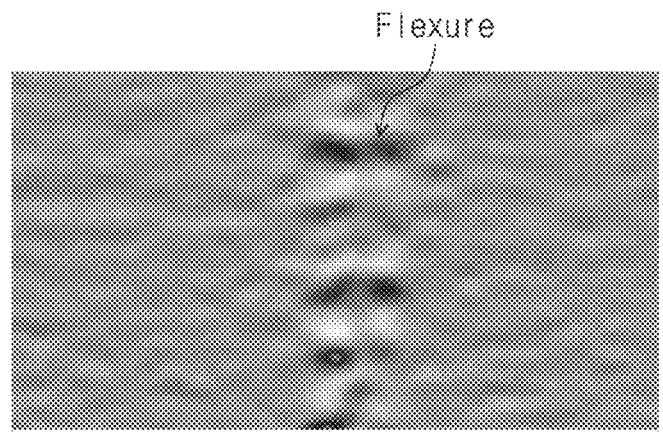
FIG. 16A illustrates a test photo for data 1.
Figure 16B:
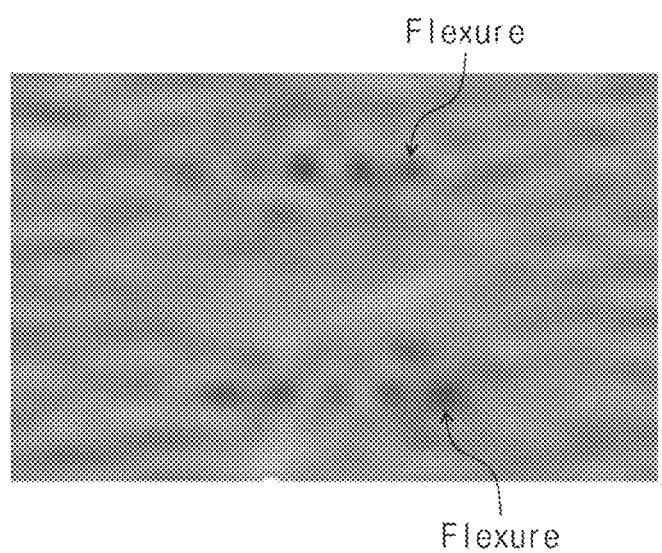
FIG. 16B illustrates a test photo for data 6.
Figure 16C:
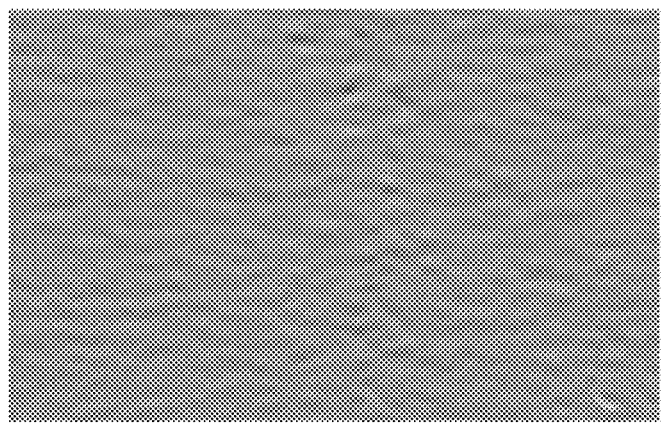
FIG. 16C illustrates a test photo for data 8.

FIG. 16A illustrates a test photo for data 1, FIG. 16B illustrates a test photo for data 6, and FIG. 16C illustrates a test photo for data 8.

Referring to FIGS. 16A and 16B, flexure on the upper surface of the display device DD (refer to FIG. 12) depending on the grid pattern formed or provided in the folding plate PLT_F (refer to FIGS. 13 to 15) is visible.

Referring to FIG. 16C, even when the grid pattern is formed or provided in the folding plate PLT_F, flexure on the upper surface of the display device DD is not visible.

Figure 17:
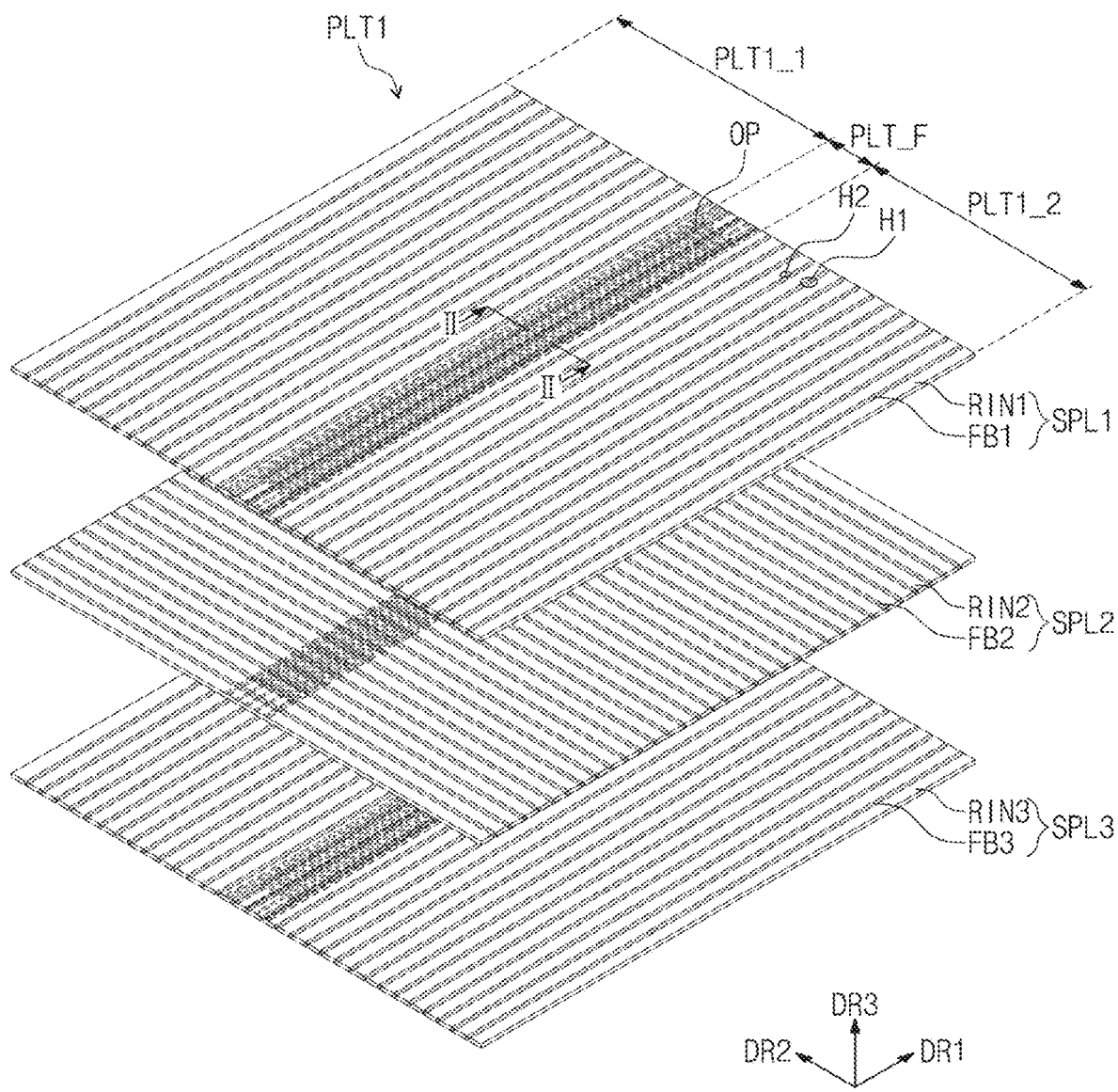
FIG. 17 is a view illustrating a configuration of the first support plate of FIG. 13.
Figure 18:
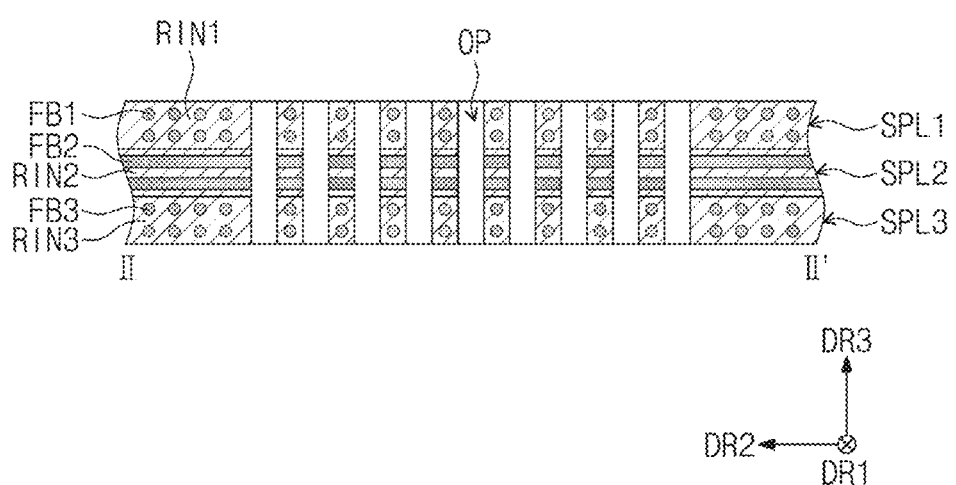
FIG. 18 is a cross-sectional view taken along line II-II' illustrated in FIG. 17.

FIG. 17 is a view illustrating a configuration of the first support plate of FIG. 13. FIG. 18 is a cross-sectional view taken along line II-IF illustrated in FIG. 17.

In FIG. 17, the openings OP are illustrated by dotted lines.

Referring to FIGS. 17 and 18, the first support plate PLT1 may include a first support layer SPL1, a second support layer SPL2 disposed under the first support layer SPL1, and a third support layer SPL3 disposed under the second support layer SPL2. The second support layer SPL2 may be disposed between the first support layer SPL1 and the third support layer SPL3.

The first support layer SPL1 may include a first resin RIN1 and a plurality of first fibers FB1 impregnated in the first resin RIN1. The second support layer SPL2 may include a second resin RIN2 and a plurality of second fibers FB2 impregnated in the second resin RIN2. The third support layer SPL3 may include a third resin RIN3 and a plurality of third fibers FB3 impregnated in the third resin RIN3.

The first, second, and third resins RIN1, RIN2, and RIN3 may include a polymer resin. The first, second, and third resins RIN1, RIN2, and RIN3 may include a thermoplastic resin. In an embodiment, the first, second, and third resins RIN1, RIN2, and RIN3 may include a polyamide-based resin or a polypropylene-based resin, for example.

The first, second, and third fibers FB1, FB2, and FB3 may include reinforced fibers. In an embodiment, the reinforced fibers may include carbon fibers or glass fibers, for example. Each of the first, second, and third fibers FB1, FB2, and FB3 may include one fiber strand. Each of the first, second, and third fibers FB1, FB2, and FB3 may include a set of a plurality of sub-fibers. In an embodiment, a plurality of sub-fibers may be joined as one bundle to form one fiber strand, for example.

The first and third fibers FB1 and FB3 may extend in the same direction as each other. The first and third fibers FB1 and FB3 may extend in a different direction from the second fibers FB2. The first and third fibers FB1 and FB3 may extend in the same direction as the openings OP. The first and third fibers FB1 and FB3 may extend parallel to the above-described folding axis FX. The first and third fibers FB1 and FB3 may extend in the first direction DR1, and the second fibers FB2 may extend in the second direction DR2.

The first support layer SPL1 and the third support layer SPL3 may form surfaces of the first support plate PLT1. To form a grid pattern in the first support plate PLT1, the openings OP may be defined to extend in the first direction DR1.

When the first and third fibers FB1 and FB3 of the first and third support layers SPL1 and SPL3, which form the surfaces of the first support plate PLT1, extend in the second direction DR2 intersecting the openings OP, a problem may occur when the openings OP are defined. In an embodiment, when the openings OP extending in the first direction DR1 are defined in the first and third fibers FB1 and FB3 extending in the second direction DR2, cut portions of the first and third fibers FB1 and FB3 may protrude to the outside, for example. Accordingly, when the openings OP are defined to intersect the first and third fibers FB1 and FB3, surfaces of a portion of the first support plate PLT1 in which a grid pattern is formed or provided may be roughened.

In an embodiment of the invention, the first and third fibers FB1 and FB3 of the first and third support layers SPL1 and SPL3, which form the surfaces of the first support plate PLT1, may be disposed parallel to the extension direction of the openings OP. When the openings OP are defined in a direction parallel to the extension direction of the first and third fibers FB1 and FB3, the surfaces of the portion of the first support plate PLT1 in which the grid pattern is formed or provided may not be roughened.

The first support plate PLT1 may be more easily folded because the first and third fibers FB1 and FB3 extend parallel to the folding axis FX in the first direction DR1.

By the embodiments of the invention, the widths of the openings defined in the folding plate of the support plate supporting the display module, the widths of the branches between the openings, and the lengths of the openings may be optimized. Thus, the grid pattern formed or provided in the folding plate may be prevented from being visible from the outside, and damage to the folding plate may be prevented.

While the invention has been described with reference to embodiments thereof, it will be apparent to those of ordinary skill in the art that various changes and modifications may be made thereto without departing from the spirit and scope of the invention as set forth in the following claims.

What is claimed is:

1. A display device comprising:
   a display panel including a first non-folding area, a folding area, and a second non-folding area; and
   a support plate which is disposed under the display panel and in which a plurality of openings arranged in a first direction and a second direction intersecting the first direction and overlapping the folding area is defined, the support plate comprising:
      a first branch disposed between openings adjacent to each other in the second direction among the plurality of openings; and
      a second branch disposed between openings adjacent to each other in the first direction among the plurality of openings,
   wherein a first width of the first branch in the second direction is smaller than a second width of each of the openings in the second direction, and
   wherein the second width of the each of the openings is constant along a length defining substantially an entire length of the each of the openings in the first direction.

2. The display device of claim 1, wherein a value obtained by dividing the second width by the first width is greater than 1.1 and less than 2.0.

3. The display device of claim 1, wherein the first width is greater than 0.13 millimeter.

4. The display device of claim 1, wherein a third width of the second branch in the first direction is greater than the second width.

5. The display device of claim 1, wherein a third width of the second branch in the first direction is equal to the second width.

6. The display device of claim 5, wherein a length of each of the openings in the first direction is greater than the first width, the second width, and the third width.

7. The display device of claim 6, wherein a value obtained by dividing the length by the first width is equal to or greater than 35.

8. The display device of claim 6, wherein the first width is 0.17 millimeter, the second width is 0.2 millimeter, the third width is 0.2 millimeter, and the length is 7.1 millimeters.

9. The display device of claim 1, wherein the plurality of openings comprises:
   a plurality of first openings arranged in the first direction; and
   a plurality of second openings arranged in the first direction and adjacent to the plurality of first openings in the second direction, the plurality of second openings being staggered with respect to the plurality of first openings.

10. The display device of claim 1, further comprising:
    a digitizer disposed under the support plate; and
    a cover layer disposed between the digitizer and the support plate and covering the plurality of openings,
    wherein the cover layer contacts the support plate and does not contact the digitizer.

11. The display device of claim 10, wherein the support plate comprises carbon fiber reinforced plastic.

12. The display device of claim 1, wherein the support plate comprises:
    a first support layer including a first resin and a plurality of first fibers impregnated in the first resin;
    a second support layer including a second resin and a plurality of second fibers impregnated in the second resin; and
    a third support layer including a third resin and a plurality of third fibers impregnated in the third resin, and
    wherein the second support layer is disposed between the first support layer and the third support layer.

13. The display device of claim 12, wherein an extension direction of the first and third fibers is different from an extension direction of the second fibers.

14. The display device of claim 12, wherein an extension direction of the first and third fibers is identical to an extension direction of the plurality of openings.

15. The display device of claim 12, wherein the first and third fibers and the openings extend in the first direction, and the second fibers extend in the second direction.

16. The display device of claim 15, wherein the first non-folding area, the folding area, and the second non-folding area are arranged in the second direction, and the folding area is folded about a folding axis parallel to the first direction.

17. A display device comprising:
    a display panel including a first non-folding area, a folding area, and a second non-folding area; and
    a support plate disposed which is disposed under the display panel and in which a plurality of openings arranged in a first direction and a second direction intersecting the first direction and overlapping the folding area is defined, the support plate comprising:
       a first branch disposed between openings adjacent to each other in the second direction among the plurality of openings, the first branch having a first width in the second direction; and
       a second branch disposed between openings adjacent to each other in the first direction among the plurality of openings,
    wherein a value obtained by dividing a second width of each of the openings in the second direction by the first width is greater than 1.1 and less than 2.0, a value obtained by dividing a length of each of the openings in the first direction by the first width is equal to or greater than 35, and the first width is greater than 0.13 millimeter, and
    wherein the second width of the each of the openings is constant along a length defining substantially an entire length of the each of the openings in the first direction.

18. The display device of claim 17, wherein a third width of the second branch in the first direction is equal to or greater than the second width.

19. An electronic device comprising:
a display device in which a first hole area through which an optical signal passes is defined;
an electro-optical module which is disposed under the display device, overlaps the first hole area, and receives the optical signal; and
a case accommodating the display device and the electro-optical module,
wherein the display device comprising:
- a display panel including a first non-folding area, a folding area, and a second non-folding area; and
- a support plate which is disposed under the display panel and in which a plurality of openings arranged in a first direction and a second direction intersecting the first direction and overlapping the folding area is defined, the support plate comprising:
  - a first branch disposed between openings adjacent to each other in the second direction among the plurality of openings, the first branch having a first width in the second direction; and
  - a second branch disposed between openings adjacent to each other in the first direction among the plurality of openings, wherein a value obtained by dividing a second width of each of the openings in the second direction by the first width is greater than 1.1 and less than 2.0, and a value obtained by dividing a length of each of the openings in the first direction by the first width is equal to or greater than 35.

20. The electronic device of claim 19, wherein a third width of the second branch in the first direction is equal to or greater than the second width, and the first width is greater than 0.13 millimeter.

* * * * *